United States Patent
Okamoto et al.

(10) Patent No.: US 10,540,592 B2
(45) Date of Patent: Jan. 21, 2020

(54) PROGRAM GENERATION APPARATUS AND PROGRAM GENERATION METHOD

(71) Applicant: FUJITSU LIMITED, Kawasaki-shi, Kanagawa (JP)

(72) Inventors: Hiroaki Okamoto, Atsugi (JP); Tsuyoshi Nagato, Isehara (JP); Tetsuo Koezuka, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 711 days.

(21) Appl. No.: 15/342,752

(22) Filed: Nov. 3, 2016

(65) Prior Publication Data

US 2017/0053204 A1 Feb. 23, 2017

Related U.S. Application Data

(63) Continuation of application No. PCT/JP2014/065470, filed on Jun. 11, 2014.

(51) Int. Cl.
*G06F 15/18* (2006.01)
*G06N 3/12* (2006.01)
*G06N 7/00* (2006.01)

(52) U.S. Cl.
CPC ............. *G06N 3/126* (2013.01); *G06N 7/005* (2013.01)

(58) Field of Classification Search
CPC .................................................... G06N 3/126

(Continued)

(56) References Cited

U.S. PATENT DOCUMENTS

| 6,532,453 B1 * | 3/2003 | Koza ...................... G06N 3/126 706/13 |
| 2007/0019841 A1 | 1/2007 | Hirose |

(Continued)

FOREIGN PATENT DOCUMENTS

| JP | 11-282822 | 10/1999 |
| JP | 2006-178857 | 7/2006 |

(Continued)

OTHER PUBLICATIONS

Japanese Platform for Patent Information, Japanese Publication No. 2006-178857, published Jul. 6, 2006.

(Continued)

*Primary Examiner* — David R Vincent
(74) *Attorney, Agent, or Firm* — Staas & Halsey LLP

(57) ABSTRACT

Each time evolution processing is performed, an information recording unit records increase-decrease information indicating a type of partial program changed in number between pre- and post-evolution individuals and difference between fitness levels calculated from the pre- and post-evolution individuals in a storage unit. A probability setting unit determines, per partial program, a contribution level indicating how much a partial program contributes to increasing a fitness level, based on the information stored in the storage unit within a predetermined period and sets a selection probability per partial program in such a manner that a partial program having a higher contribution level is given a higher selection probability. When the evolution processing is performed, a generation processing unit selects a partial program to be included in the post-evolution individual in mutation processing according to the set selection probabilities.

15 Claims, 23 Drawing Sheets

(58) Field of Classification Search
USPC .................................................... 706/15, 45
See application file for complete search history.

(56) References Cited

U.S. PATENT DOCUMENTS

| | | | |
|---|---|---|---|
| 2009/0096895 A1 | 4/2009 | Benezra et al. | |
| 2009/0297044 A1 | 12/2009 | Kokumai et al. | |
| 2010/0179930 A1* | 7/2010 | Teller .................... | G06N 20/00 706/12 |

FOREIGN PATENT DOCUMENTS

| | | |
|---|---|---|
| JP | 2010-244363 | 10/2010 |
| WO | WO 2006/001107 A1 | 1/2006 |

OTHER PUBLICATIONS

Japanese Platform for Patent Information, Japanese Publication No. 2010-244363, published Oct. 28, 2010.

Japanese Platform for Patent Information, Japanese Publication No. 11-282822, published Oct. 15, 1999.

Chunlei Cui et al., "An Adaptive Mutation Method for GA Based on Relative Importance", Advanced Computer Theory and Engineering(ICACTE), vol. 5, 2010 3rd International Conference, Aug. 22, 2010, pp. 111-113.

Shinya Aoki et al., "ACTIT: Automatic Construction of Tree-structural Image Transformations," The Journal of the Institute of Image Information and Television Engineers, vol. 53, No. 6, Jun. 20, 1999, pp. 888-894.

International Search Report dated Sep. 9, 2014 in corresponding International Application No. PCT/JP2014/065470.

Written Opinion of the International Searching Authority dated Sep. 9, 2014 in corresponding International Application No. PCT/JP2014/065470.

Extended European Search Report dated Apr. 10, 2017 in corresponding European Patent Application No. 14894688.2.

Tomoharu Nagao et al., "Automatic Construction of Image Transformation Processes Using Genetic Algorithm", Proceedings of the International Conference on Image Processing, Sep. 16, 1996, Lausanne, Switzerland, vol. 3, pp. 731-734, IEEE, N.Y., N.Y.

Office Action for corresponding Japanese Patent Application No. 2016-527548, dated Jan. 16, 2018.

* cited by examiner

LIST OF FILTERS AND
FITNESS LEVELS

| PARENT INDIVIDUAL | CHILD INDIVIDUAL |
|---|---|
| F1 | F1 |
| F1 | F1 |
| F1 | F2 |
| F2 | F2 |
| F2 | F2 |
| F3 | F3 |
| F3 | F3 |
| F4 | F4 |
| F4 | F5 |
| F4 | F5 |
|  | F5 |
| FITNESS LEVEL = 0.5 | FITNESS LEVEL = 0.7 |

81

DIFFERENCE IN NUMBER
OF FILTERS

| FILTER | DIFFERENCE |
|---|---|
| F1 | −1 |
| F2 | 1 |
| F3 | 0 |
| F4 | −2 |
| F5 | 3 |

82

| F1 | F2 | F3 | F4 | F5 |
|---|---|---|---|---|
| 0 | 0.2 | 0 | 0 | 0.2 |

CHANGE OF FITNESS LEVEL IS
REGISTERED FOR ONLY TYPES OF
FILTERS INCREASED IN NUMBER

FIG. 11A

| F1 | F2 | F3 | F4 | F5 |
|---|---|---|---|---|
| −0.2 | 0.2 | 0 | −0.2 | 0.2 |

CHANGE OF FITNESS LEVEL IS ALSO
REGISTERED FOR TYPES OF FILTERS
DECREASED IN NUMBER

FIG. 11B

| F1 | F2 | F3 | F4 | F5 |
|---|---|---|---|---|
| −0.1 | 0.1 | 0 | −0.05 | 0.033 |

CHANGE OF FITNESS LEVEL IS DEFINED
BASED ON NUMBER OF FILTERS
CHANGED IN NUMBER

FIG. 11C

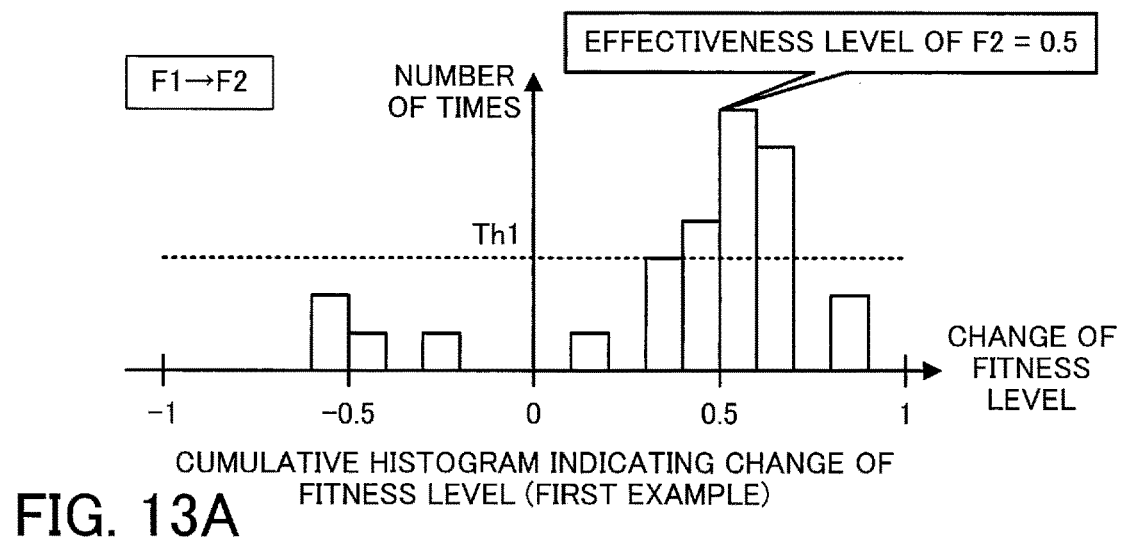
FIG. 13A CUMULATIVE HISTOGRAM INDICATING CHANGE OF FITNESS LEVEL (FIRST EXAMPLE)
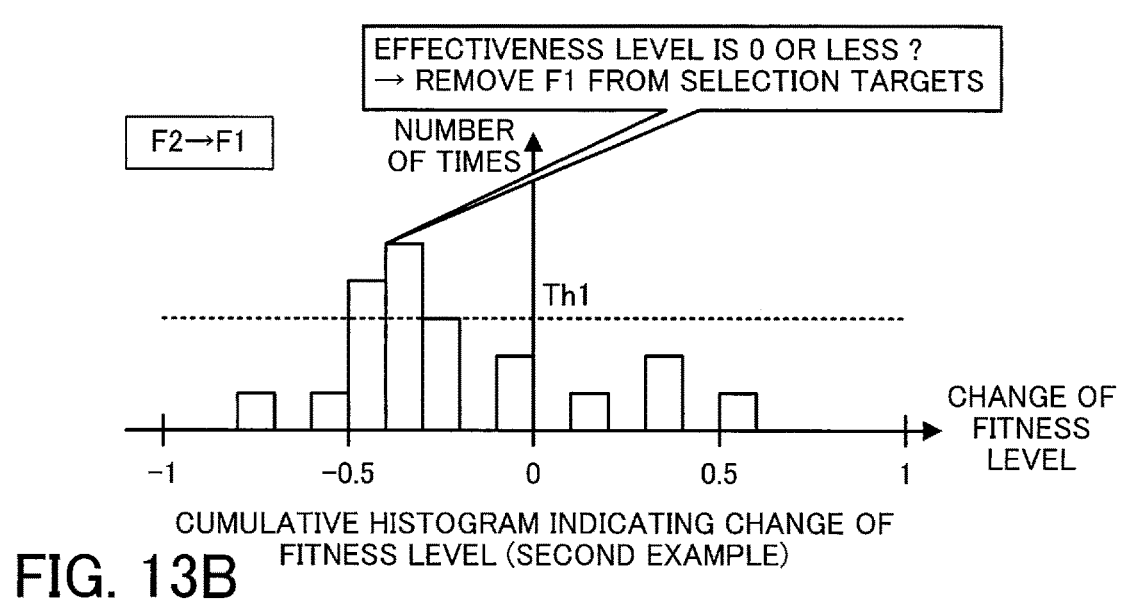
FIG. 13B CUMULATIVE HISTOGRAM INDICATING CHANGE OF FITNESS LEVEL (SECOND EXAMPLE)
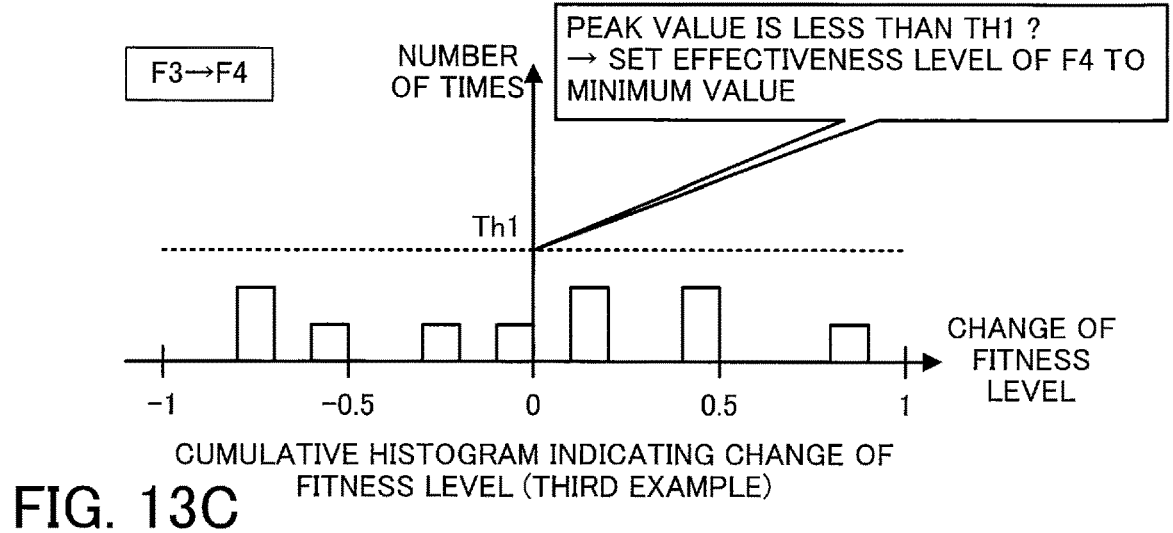
FIG. 13C CUMULATIVE HISTOGRAM INDICATING CHANGE OF FITNESS LEVEL (THIRD EXAMPLE)

| | IMAGE FILTERS INCREASED IN NUMBER (Fn) | | | | |
|---|---|---|---|---|---|
| | F1 | F2 | F3 | F4 | F5 |
| F1 | | 0.90 | 0.30 | 0.20 | 0.60 |
| F2 | -0.40 | | -0.10 | -0.20 | 0.30 |
| F3 | -0.20 | 0.50 | | 0.00 | 0.20 |
| F4 | -0.10 | 0.30 | 0.10 | | 0.30 |
| F5 | -0.20 | 0.10 | -0.20 | -0.10 | |
| EFFECTIVE LEVEL (AVERAGE VALUE) | -0.225 | 0.45 | 0.025 | -0.025 | 0.35 |
| DIFFERENCE FROM OVERALL AVERAGE | -0.34 | 0.34 | -0.09 | -0.14 | 0.24 |
| SELECTION PROBABILITY | 0.030 | 0.368 | 0.155 | 0.130 | 0.318 |

(AVERAGE VALUE OF EFFECTIVENESS LEVELS OF ALL IMAGE FILTERS = 0.115)

IMAGE FILTERS DECREASED IN NUMBER (Fm)

FIG. 14

PROGRAM GENERATION APPARATUS AND PROGRAM GENERATION METHOD

CROSS-REFERENCE TO RELATED APPLICATION

This application is a continuation application of International Application PCT/JP2014/065470 filed on Jun. 11, 2014 which designated the U.S., the entire contents of which are incorporated herein by reference.

FIELD

The embodiments discussed herein relates to a program generation apparatus and a program generation method.

BACKGROUND

Techniques of automatically generating an image processing program that performs desired image processing on the basis of genetic programming are drawing attention. In these techniques, an image processing program, which is generated by combining partial programs (for example, image filter programs) for image processing, is optimized by using an input image and an image (a target image) obtained as a result of processing on the basis of genetic programming.

In relation to this, for example, there has been proposed a technique relating to processing for generating a processing program. In this technique, when more nodes are used in the processing program, a smaller value is calculated as a fitness level used in genetic programming.

As an example of a technique of generating an image processing procedure, there has been proposed a technique in which image processing procedures, each of which has a high fitness level, are crossed with one another.

See, for example, the following documents:
Japanese Laid-open Patent Publication No. 2006-178857;
International Publication Pamphlet No. WO2006/001107; and
Shinya Aoki and Tomoharu Nagao, "ACTIT: Automatic Construction of Tree-structural Image Transformations," The Journal of The institute of Image Information and Television Engineers, Vol. 53, No. 6, Jun. 20, 1999, p. 888-894.

The above processing in which an image processing program is automatically generated on the basis of genetic programming has a problem that much time is needed for the program generation processing. For example, in the case of the above processing, if more selectable partial programs are prepared, it is more likely that high-quality image processing is performed. However, it is also more likely that much time is needed for a fitness level calculated during processing to reach a high value. As a result, it is more likely that more time is needed to complete the program generation processing.

SUMMARY

In one aspect, there is provided a program generation apparatus including: a memory; and a processor configured to perform a procedure including: generating an image processing program by determining, based on genetic programming, a combination of partial programs to be included in the image processing program from a plurality of partial programs, the generating including evolution processing for evolving an individual formed by a combination of partial programs selected from the plurality of partial programs; recording, in the memory, information indicating a type of partial program that has been changed in number between pre- and post-evolution individuals and indicating difference between fitness levels calculated based on the pre- and post-evolution individuals, respectively, each time the evolution processing is performed; and determining, for each of the plurality of partial programs, a contribution level indicating how much an individual partial program contributes to increasing a fitness level, based on information accumulated in the memory within a predetermined time period and setting a selection probability for each of the plurality of partial programs in such a manner that a first partial program having a higher contribution level than a second partial program is given a higher setting value as a selection probability of the first partial program than the second partial program, wherein the evolution processing performed after the setting of the selection probability for each of the plurality of partial programs includes selecting a partial program to be included in a post-evolution individual in mutation processing from the plurality of partial programs according to selection probabilities set for respective ones of the plurality of partial programs.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 11A to 11C illustrate a third example of the processing for registering change of a fitness level;

FIGS. 13A to 13C illustrate examples of cumulative histograms indicating changes of fitness levels;

FIG. 14 illustrates another example of processing for setting selection probabilities;

DESCRIPTION OF EMBODIMENTS

Figure 1:
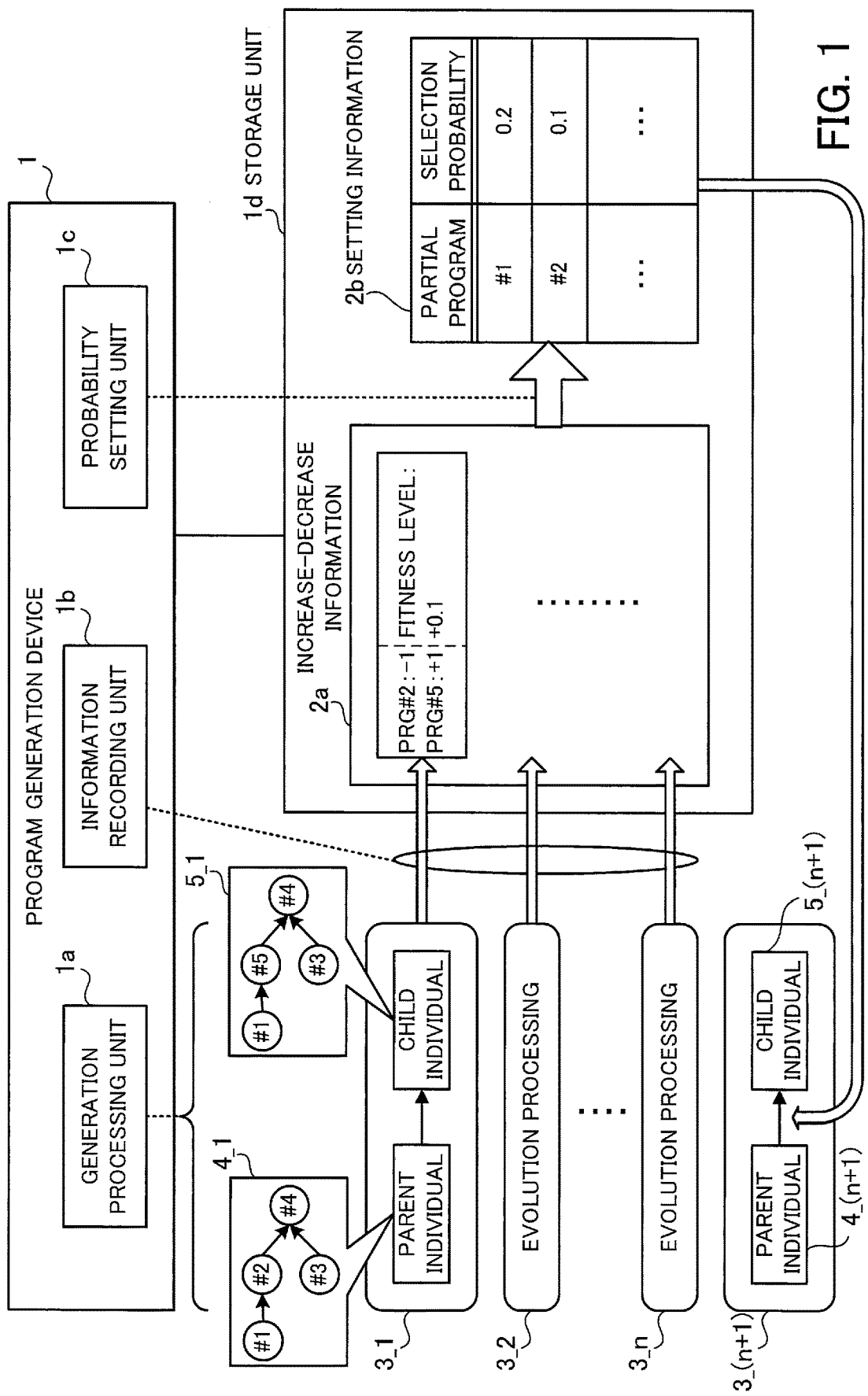
FIG. 1 illustrates an example of a configuration and processing of a program generation device according to a first embodiment.

Several embodiments will be described below with reference to the accompanying drawings, wherein like reference characters refer to like elements throughout.

First Embodiment

FIG. 1 illustrates an example of a configuration and processing of a program generation device according to a first embodiment. A program generation device 1 includes a generation processing unit 1a, an information recording unit 1b, a probability setting unit 1c, and a storage unit 1d. While the storage unit 1d is illustrated outside the program generation device 1 in FIG. 1, the storage unit 1d is realized as a storage area in a storage device included in the program generation device 1.

The generation processing unit 1a generates an image processing program on the basis of genetic programming. The generation processing unit 1a generates an image processing program by combining partial programs, each of which is used for performing image processing. The generation processing unit 1a determines the combination of partial programs to be included in the image processing program on the basis of genetic programming.

For example, a plurality of partial programs that can be included in the image processing program is stored in advance in the storage unit 1d. For example, the generation processing unit 1a generates a predetermined number of individuals each of which is formed by randomly selecting and combining stored partial programs. Next, the generation processing unit 1a evolves the generated individuals and removes individuals having low fitness levels. In this way, the generation processing unit 1a determines an individual formed by an optimized combination of partial programs and outputs this individual as a final image processing program.

Examples of the evolution processing for evolving the individuals include crossover processing in which partial programs are exchanged between two parent individuals and mutation processing in which another partial program is substituted as a partial program to be included in the next parent individual. In an initial state, a partial program to be included in a child individual in the mutation processing is selected randomly (namely, with the same probability) from the partial programs stored in advance. As will be described below, after a selection probability is set per partial program, a partial program to be included in a child individual is selected according to the set selection probabilities.

Each time the generation processing unit 1a performs evolution processing, the information recording unit 1b records information indicating a type of partial program that has been changed in number between pre- and post-evolution individuals and indicating difference between fitness levels calculated based on the pre- and post-evolution individuals, respectively, in the storage unit 1d. In FIG. 1, the information recorded in the storage unit 1d by the information recording unit 1b is expressed as "increase-decrease information 2a."

For example, as illustrated in FIG. 1, in evolution processing 3_1, a child individual 5_1 is generated from a parent individual 4_1. The parent individual 4_1 includes partial programs #1 to #4, and the child individual 5_1 includes partial programs #1 and #3 to #5. Namely, when the parent individual 4_1 evolves to the child individual 5_1, the partial program #2 is removed, and the partial program #5 is newly included.

In this case, for example, the information recording unit 1b records information indicating the partial programs #2 and #5 as the partial programs, each of which has been changed in number as a result of the evolution processing, in the increase-decrease information 2a. In the example in FIG. 1, the information recording unit 1b records a value "−1" in association with the partial program #2 and a value "+1" in association with the partial program #5 in the increase-decrease information 2a. This indicates that one partial program #2 has been subtracted and one partial program #5 has been added as a result of the evolution processing. The information recording unit 1b may record only the information about the partial program #5 added as a result of the evolution processing in the increase-decrease information 2a.

In addition, in the evolution processing 3_1, a fitness level calculated based on the child individual 5_1 is larger than a fitness level calculated based on the parent individual 4_1 by "0.1". In this case, for example, the information recording unit 1b records a value "+0.1" in the increase-decrease information 2a, as the information indicating the difference between the fitness levels calculated based on the pre- and post-evolution individuals. For example, only when the fitness level is increased as a result of evolution processing, the information recording unit 1b may record the information indicating the difference between the fitness levels in the increase-decrease information 2a.

The probability setting unit 1c determines, per partial program, a contribution level indicating how much an individual partial program contributes to increasing a fitness level, based on the information recorded in the storage unit 1d by the information recording unit 1b within a predetermined time period. The probability setting unit 1c sets a selection probability per partial program in such a manner that a partial program having a higher contribution level is given a higher setting value as its selection probability.

For example, as illustrated in FIG. 1, the probability setting unit 1c determines a contribution level per partial program on the basis of the increase-decrease information 2a recorded within the time period in which n times of evolution processing 3_1 to 3_n is performed. Next, on the basis of the determination results, the probability setting unit 1c sets a selection probability per partial program in setting information 2b.

After the probability setting unit 1c sets the setting information 2b, when the generation processing unit 1a performs evolution processing, the generation processing unit 1a selects a partial program to be included in a post-evolution individual in mutation processing on the basis of the selection probabilities set in the setting information 2b. For example, when the generation processing unit 1a performs mutation processing on the parent individual 4_(n+1) to generate a child individual 5_(n+1) in the (n+1)th evolution processing 3_(n+1), the generation processing unit 1a does not randomly select a partial program to be newly included in the child individual 5_(n+1) but according to the selection probabilities set in the setting information 2b. In this way, a partial program with a higher selection probability is more likely to be newly included in the child individual in the next mutation processing.

On the basis of the increase-decrease information 2a recorded in the storage unit 1d within the predetermined time period, the probability setting unit 1c can estimate a contribution level indicating how much an individual partial program contributes to increasing a fitness level as follows. For example, when the fitness level has been increased as a result of evolution processing, it can be assumed that a type of partial program that has been increased in number as a result of the evolution processing is likely to have contributed to the increase of the fitness level. In addition, when the fitness level has been increased as a result of evolution processing, it can be assumed that, if more types of partial programs have been increased in number as a result of the evolution processing, each type of partial program has a lower contribution level with respect to the increase of the fitness level. In addition, when the fitness level has been decreased as a result of evolution processing, it can be assumed that a type of partial program been increased in number as a result of the evolution processing is not likely to contribute to increasing the fitness level.

On the basis of these contribution levels determined in this way, the probability setting unit 1c sets a selection probability per partial program in such a manner that a partial program having a higher contribution level is given a higher setting value as its selection probability. In this way, when performing mutation processing subsequently, a partial program that is more likely to contribute to increasing the fitness level is more likely to be newly included in a child individual. As a result, it is more likely that a higher fitness level is calculated based on the generated child individual. In addition, by repeating evolution processing in this way, the fitness level reaches a higher value more easily, and the learning is facilitated. Thus, the program generation device 1 needs less time for the program generation processing while maintaining the quality of the generated image processing program.

In the processing for generating an image processing program on the basis of genetic programming, when more selectable partial programs are prepared, it is more likely that the generated image processing program performs image processing with higher quality. However, since the fitness level does not easily reach a high value, it is more likely that more time is needed for the program generation processing.

With the program generation device 1 according to the present embodiment, even when the number of selectable partial programs is increased, a partial program that is more likely to contribute to increasing the fitness level is selected with a higher probability from these partial programs as the learning progresses. In this way, the fitness level reaches a high value more easily, and the learning is facilitated. Thus, it is more likely that an image processing program that performs high-quality image processing is generated within a short time.

Second Embodiment

Next, an image processing device according to a second embodiment will be described. The image processing device according to the second embodiment includes the processing functions of the program generation device illustrated in FIG. 1 and includes a function of performing image processing by executing an image processing program generated by the processing functions.

In the following description, first, a reference example indicating a basic procedure of processing for generating an image processing program on the basis of genetic programming will be described with reference to FIG. 2. Next, the image processing device according to the second embodiment will be described.

Figure 2:
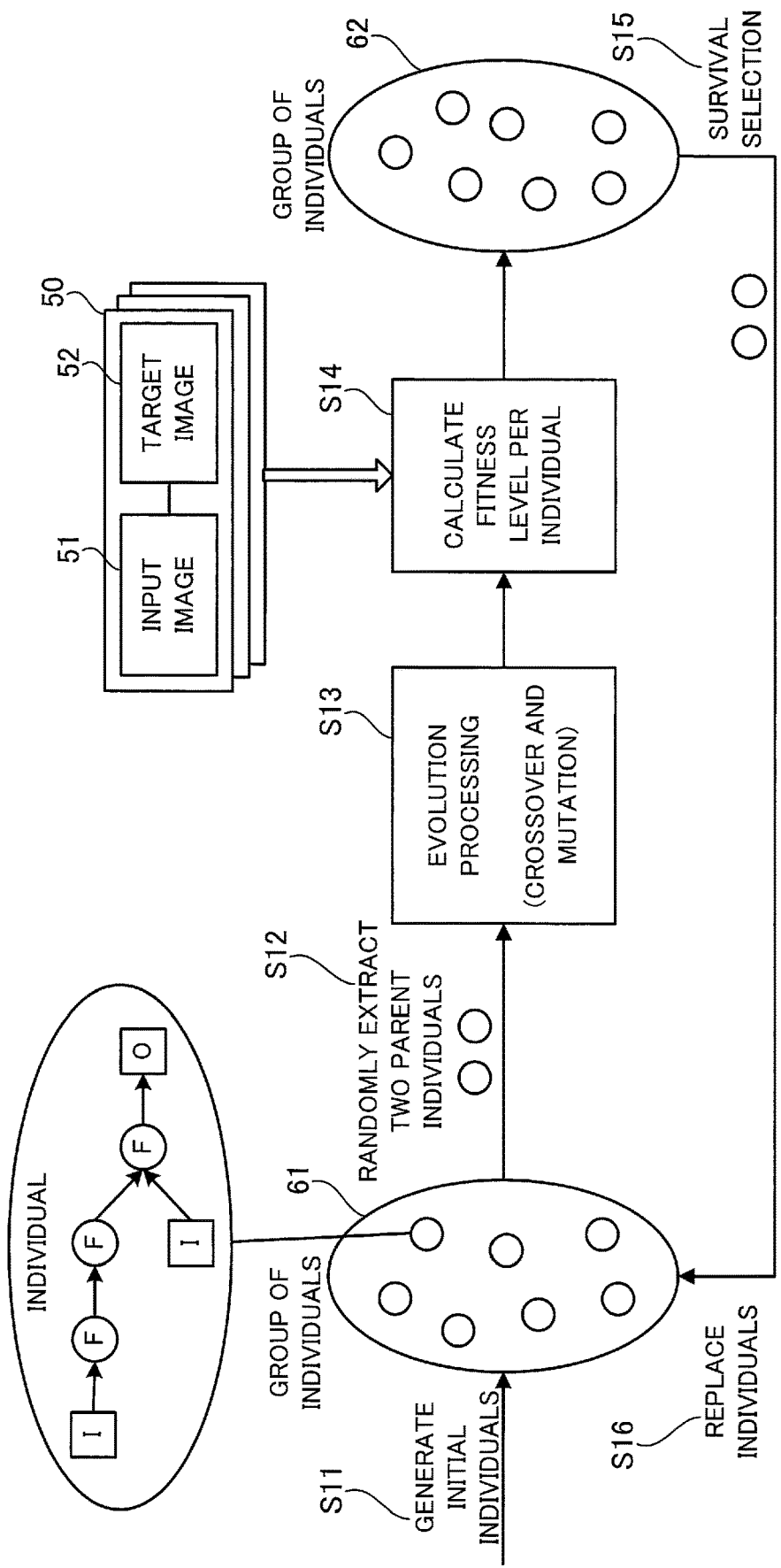
FIG. 2 illustrates a reference example of a procedure of processing for generating an image processing program.

FIG. 2 illustrates a reference example of a procedure of processing for generating an image processing program.

Before the processing for generating an image processing program is started, at least one learning data 50 is prepared. The learning data 50 includes an input image 51 and a target image 52, which is obtained by performing image processing on the input image 51. For example, the input image 51 can be obtained by capturing an image of a subject with a camera.

In the processing for generating an image processing program on the basis of genetic programming, an individual is formed by combining at least one partial program. For example, as illustrated in the top left corner in FIG. 2, an individual is defined by a tree structure.

A plurality of partial programs that can be included in individuals is also prepared. The following description assumes image filters as examples of the partial programs that can be included in the individuals. However, the examples of the partial programs are not limited to image filters. Other programs that perform other kinds of image processing may be used. In the top left corner in FIG. 2, "F," "I," and "O" represent an image filter, an input terminal, and an output terminal, respectively.

For example, the processing for generating an image processing program on the basis of genetic programming is performed as follows. First, a group of individuals 61, which is a plurality of initial individuals, is generated (step S11). Image filters are randomly selected from a plurality of prepared image filters and included in an individual one of the initial individuals. Next, two parent individuals are randomly extracted from the group of individuals 61 generated (step S12).

Next, by performing evolution processing on these two parent individuals, two child individuals are generated (step S13). In the evolution processing, crossover processing and mutation processing are performed on the two parent individuals. Different kinds of crossover processing and mutation processing may be performed on each of the two parent individuals, and at least three child individuals may be generated as a result.

Next, a fitness level is calculated for each of the child individuals generated as a result of the evolution processing and the parent individuals (step S14). In this processing, by performing image processing using an individual one of the individuals on an individual one of the input images 51 in the learning data 50 and comparing an individual image obtained by this image processing with the corresponding target image 52, an individual fitness level is calculated. If a plurality of learning data 50 is used, each one of the individuals is applied to each of the plurality of learning data 50, and an average value of the fitness levels is calculated.

If the fitness level of any one of the individuals is a predetermined threshold or more, that individual is outputted as a final image processing program, and the program generation processing is ended. However, if the fitness levels of all the individuals are less than the predetermined threshold, survival selection is performed from a group of individuals 62 including the generated child individuals and the two original parent individuals (step S15). In this survival selection, an individual with the highest fitness level calculated is selected from the group of individuals 62. In addition, one individual is selected from the remaining individuals in the group of individuals 62 by using a predetermined method. For example, from the remaining individuals, an individual is selected according to the probabilities based on the fitness levels.

The two individuals selected by the survival selection are substituted for the two individuals extracted as the parent individuals in the group of individuals 61 (step S16). Consequently, the individuals included in the group of individuals 61 are changed to the next-generation individuals. Next, the like processing is repeated until an individual whose fitness level is the predetermined threshold or more appears.

For example, the image processing program generated by the above procedure may be used in the field of FA (factory automation). More specifically, the image processing program may be used to obtain a desired effect by performing the corresponding image processing on an image of a product. For example, the image processing may be performed on an image of the exterior of a product, to extract a defective portion or an alignment portion.

When an image processing program is used for such a purpose, for example, if a subject product is changed or modified or if the imaging environment is changed along with the change or modification of a product, an image processing algorithm may need to be reconfigured. Thus, an image processing algorithm that can easily be configured is demanded. In addition, an image processing algorithm having high robustness against change of the imaging environment, such as against change of lighting conditions and variation of the shape, position, or orientation of the subject, is demanded.

If genetic programming is used, only by preparing at least one input image 51 and at least one corresponding target image 52, an image processing program that can be used for the above purposes can easily be generated. In addition, by preparing a plurality of pairs of learning data 50, each pair including an input image 51 and a target image 52, the input images 51 having been captured in different imaging environments, an image processing algorithm with high robustness against change of the imaging environment can automatically be generated.

However, the processing for generating an image processing program on the basis of genetic programming has a problem that the processing takes a long processing time. In particular, if more selectable image filters are prepared, it is more likely that convergence of the learning could be more difficult and that the processing time could be extended, while it is more likely that high quality image processing could be performed.

One conceivable reason why the processing time could be extended is that image filters are randomly selected in the process of evolving component filters. For example, if an image filter is randomly selected, an image filter that is not suitable for performing desired image processing could be selected. In such an unsuitable image filter is selected, a post-evolution individual having a lower fitness level could be generated. If such an unsuitable image filter is selected many times, since unnecessary evolution processing is performed many times, the learning slows down.

Thus, the image processing device according to the second embodiment additionally includes processing in addition to the above program generation procedure. More specifically, in the evolution processing, the image processing device is more likely to select an image filter that is more likely to contribute to increasing the fitness level. Thus, the image processing device needs less time for the program generation processing while maintaining the quality of the image processing performed by the generated image processing program. In addition, even when the number of selectable image filters is increased, the chance that the time needed for the program generation processing is extended is reduced.

Hereinafter, the image processing device according to the second embodiment will be described in detail.

Figure 3:
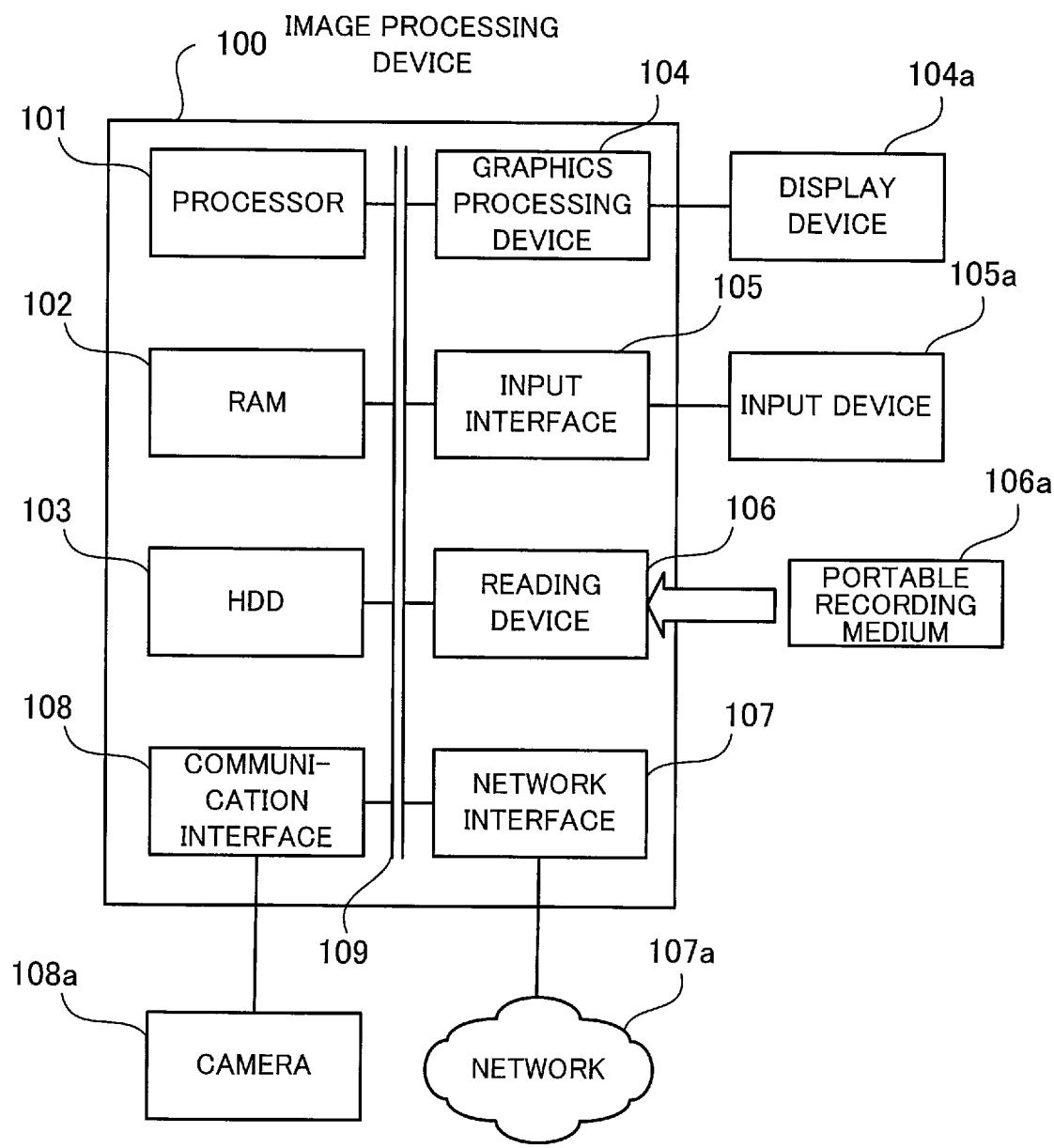
FIG. 3 illustrates an example of a hardware configuration of an image processing device.

FIG. 3 illustrates an example of a hardware configuration of an image processing device. For example, an image processing device 100 is realized as a computer as illustrated in FIG. 3.

The image processing device 100 is comprehensively controlled by a processor 101. The processor 101 may be a multiprocessor. Examples of the processor 101 include a CPU (central processing unit), an MPU (micro processing unit), a DSP (digital signal processor), an ASIC (application specific integrated circuit), and a PLD (programmable logic device). The processor 101 may be a combination of at least two elements of a CPU, an MPU, a DSP, an ASIC, and a PLD.

The processor 101 is connected to a RAM (random access memory) 102 and a plurality of peripheral devices via a bus 109.

The RAM 102 is used as a main storage device of the image processing device 100. At least part of an OS (operating system) program or an application program executed by the processor 101 is temporarily stored in the RAM 102. In addition, various kinds of data for the processing performed by the processor 101 are stored in the RAM 102.

Examples of the peripheral devices connected to the bus 109 include an HDD (hard disk drive) 103, a graphics processing device 104, an input interface 105, a reading device 106, a network interface 107, and a communication interface 108.

The HDD 103 is used as an auxiliary storage device of the image processing device 100. An OS program, application programs, and various kinds of data are stored in the HDD 103. A different kind of non-volatile storage device such as an SSD (solid state drive) may be used as the auxiliary storage device.

The graphics processing device 104 is connected to a display device 104a. The graphics processing device 104 displays an image on a screen of the display device 104a in accordance with an instruction from the processor 101. Examples of the display device include a CRT (cathode ray tube) display device and a liquid crystal display device.

The input interface 105 is connected to an input device 105a. The input interface 105 transmits a signal outputted from the input device 105a to the processor 101. Examples of the input device 105a include a keyboard and a pointing device. Examples of the pointing device include a mouse, a touch panel, a tablet, a touchpad, and a trackball.

A portable recording medium 106a can be attached to the reading device 106. The reading device 106 reads data recorded in the portable recording medium 106a and transmits the read data to the processor 101. Examples of the portable recording medium 106a include an optical disc, a magneto-optical disk, and a semiconductor memory.

The network interface 107 exchanges data with other devices via a network 107a.

The communication interface 108 exchanges data with an external device connected thereto. In the present embodiment, a camera 108*a* as the external device is connected to the communication interface 108. The communication interface 108 transmits image data transmitted from the camera 108*a* to the processor.

The processing functions of the image processing device 100 may be realized by the above hardware configuration.

Figure 4:
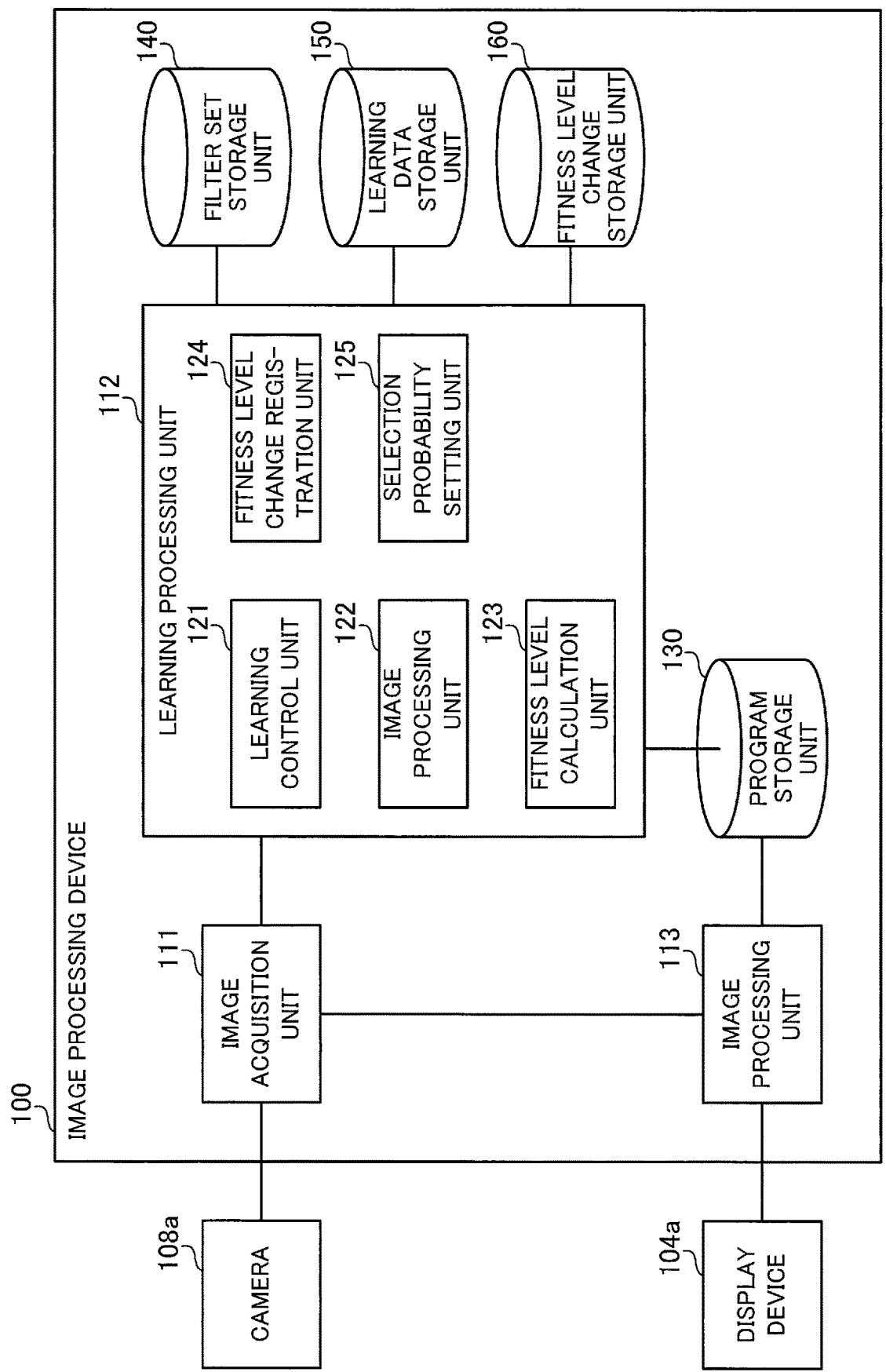
FIG. 4 is a block diagram illustrating a configuration example of processing functions of the image processing device.

FIG. 4 is a block diagram illustrating a configuration example of the processing functions of the image processing device. The image processing device 100 includes an image acquisition unit 111, a learning processing unit 112, an image processing unit 113, a program storage unit 130, a filter set storage unit 140, a learning data storage unit 150, and a fitness level change storage unit 160.

For example, processing of the image acquisition unit 111 and processing of the learning processing unit 112 are realized by causing the processor 101 of the image processing device 100 to execute predetermined programs. For example, the program storage unit 130, the filter set storage unit 140, and the learning data storage unit 150 are realized as storage areas in the HDD 103 of the image processing device 100. For example, the fitness level change storage unit 160 is realized as a storage area in the RAM 102 of the image processing device 100.

The image acquisition unit 111 acquires data of a captured image from the camera 108*a* and outputs the acquired data to the learning processing unit 112 or the image processing unit 113.

The learning processing unit 112 generates an image processing program on the basis of genetic programming and stores the generated image processing program in the program storage unit 130.

Processing of the image processing unit 113 is realized by causing the processor 101 of the image processing device 100 to execute the image processing program stored in the program storage unit 130. The image processing unit 113 acquires data of the image captured by the camera 108*a* via the image acquisition unit 111 and performs image processing on the acquired image data. The processed image is displayed by the display device 104*a*, for example.

The filter set storage unit 140 holds a plurality of image filter programs that can be selected by the learning processing unit 112. In addition, the filter set storage unit 140 holds selection probabilities associated with the respective image filters.

The learning data storage unit 150 holds at least one learning data, each of which includes data of an input image and data of a corresponding target image. For example, the input image included in the learning data may be an image captured by the camera 108*a* connected to the image processing device 100.

A fitness level change table, which will be described below, is stored in the fitness level change storage unit 160. The fitness level change table is an example of the increase-decrease information 2*a* illustrated in FIG. 1. The fitness level change table holds information indicating a type of partial program that has been changed in number between parent and child individuals as a result of evolution processing and indicating the difference between fitness levels calculated on the basis of the parent and child individuals, respectively.

The learning processing unit 112 includes a learning control unit 121, an image processing unit 122, a fitness level calculation unit 123, a fitness level change registration unit 124, and a selection probability setting unit 125. The learning control unit 121, the image processing unit 122, and the fitness level calculation unit 123 are examples of the generation processing unit 1*a* illustrated in FIG. 1. The fitness level change registration unit 124 is an example of the information recording unit 1*b* illustrated in FIG. 1, and the selection probability setting unit 125 is an example of the probability setting unit 1*c* illustrated in FIG. 1.

The learning control unit 121 comprehensively controls the program generation processing of the learning processing unit 112.

The image processing unit 122 performs image processing based on an individual generated when the program generation processing is performed on an input image stored in the learning data storage unit 150.

When the image processing unit 122 performs the processing on the input image, the fitness level calculation unit 123 compares the processed image with a corresponding target image stored in the learning data storage unit 150 and calculates a fitness level.

The fitness level change registration unit 124 determines a type of partial program that has been changed in number between parent and child individuals as a result of evolution processing and the difference between the fitness levels calculated on the basis of the parent and child individuals. The fitness level change registration unit 124 registers information based on the determination results in the fitness level change storage unit 160.

On the basis of the information registered in the fitness level change storage unit 160 within a predetermined time period, the selection probability setting unit 125 calculates a selection probability for each of the image filters registered in the filter set storage unit 140. The selection probability setting unit 125 stores the calculated selection probabilities in association with the respective image filters in the filter set storage unit 140.

Figure 5:
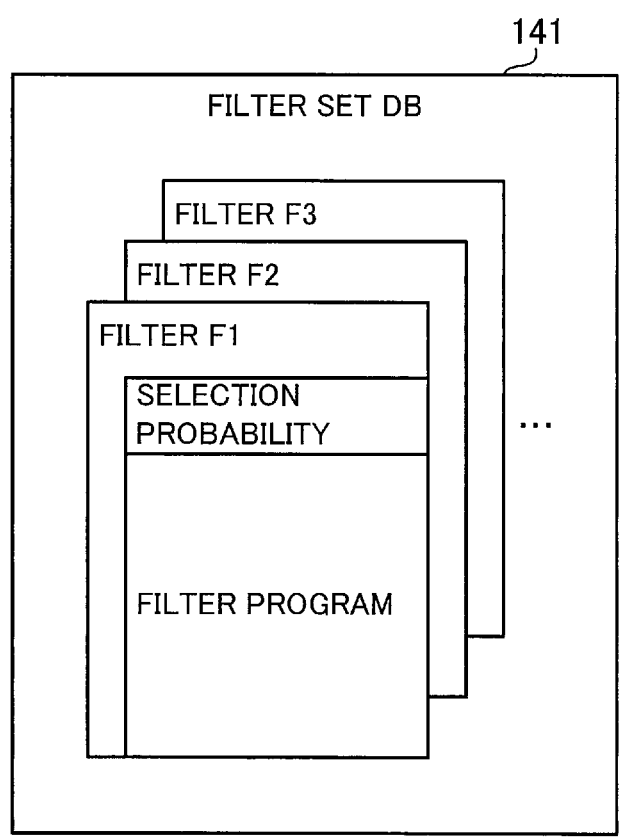
FIG. 5 illustrates an example of information registered in a filter set database.

FIG. 5 illustrates an example of information registered in a filter set database. A filter set database (DB) 141 is an example of the setting information 2*b* illustrated in FIG. 1 and is stored in the filter set storage unit 140 in FIG. 4.

In the filter set database 141, a record is registered for each image filter that can be included in an image processing program. In each record, a program code of the corresponding image filter and a selection probability are registered. In an initial state, under the column "selection probability," the same value is set to all the image filters (for example, a value obtained by dividing a value "1" by the number of registered image filters).

Next, two examples of the fitness level change table registered in the fitness level change storage unit 160 will be described.

Figure 6:
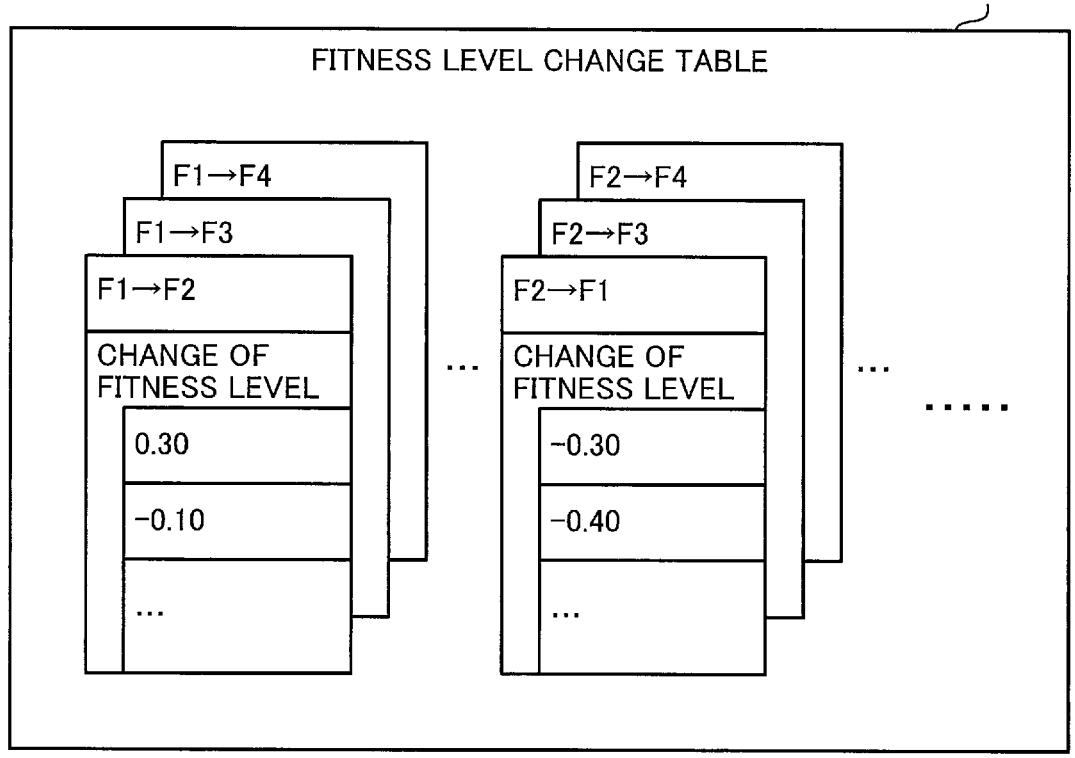
FIG. 6 illustrates a first example of a fitness level change table.

FIG. 6 illustrates a first example of the fitness level change table. Records are registered in a fitness level change table 151 illustrated in FIG. 6, and each record indicates a pair of a type of image filter that has been decreased in number and a type of image filter that has been increased in number included in an individual as a result of evolution processing. For example, in FIG. 6, a record corresponding to "F1->F2" indicates that the number of image filters F1 has been decreased and the number of image filters F2 has been increased as a result of evolution processing. This happens, for example, when an image filter F1 included in a parent individual is replaced by an image filter F2 that is added to a child individual.

In addition, change of a fitness level is recorded in each record. A fitness level is calculated on the basis of a value obtained by subtracting the fitness level calculated based on a pre-evolution parent individual from the fitness level calculated based on a post-evolution child individual. As the value indicating the change of the fitness level, for example, the above difference may be recorded without change.

Alternatively, as will be described below, a value obtained by defining the above difference with the number of image filters changed as a result of evolution processing may be recorded. For example, each time evolution processing is performed, the value indicating change of a fitness level is recorded in a corresponding record.

Figure 7:
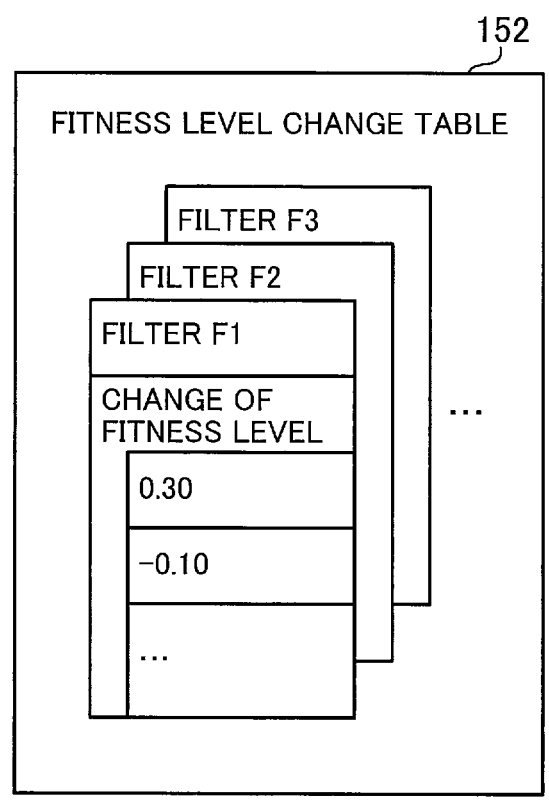
FIG. 7 illustrates a second example of the fitness level change table.

FIG. 7 illustrates a second example of the fitness level change table. In a fitness level change table 152 illustrated in FIG. 7, unlike the example in FIG. 6, a record is registered for each image filter, and a value indicating change of a fitness level is recorded in each record. For example, the value indicating change of a fitness level is registered in a corresponding record when the number of corresponding image filters has been increased as a result of evolution processing. The value indicating change of a fitness level may be recorded in a corresponding record when the number of corresponding image filters has been decreased as a result of evolution processing.

Next, an example of how the fitness level change registration unit 124 registers change of a fitness level by using the above fitness level change table 151 or 152 will be described. First, an example of processing for registering change of a fitness level performed when image filters have been changed as a result of evolution processing will be described with reference FIGS. 8 and 9.

Figure 8:
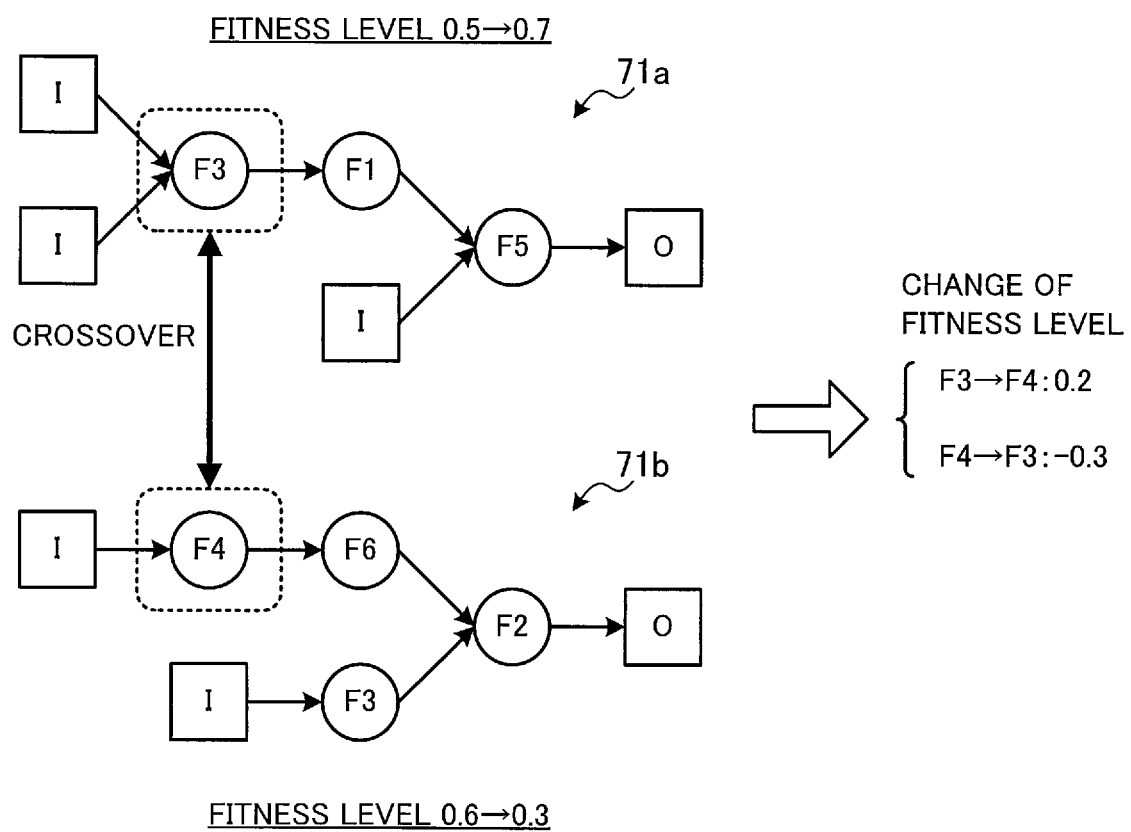
FIG. 8 illustrates a first example of processing for registering change of fitness levels.

FIG. 8 illustrates a first example of processing for registering change of fitness levels. In FIG. 8, a parent individual 71a includes image filters F1, F3, and F5, and a parent individual 71b includes image filters F2, F3, F4, and F6. By performing crossover processing between the parent individual 71a and the parent individual 71b, child individuals (not illustrated) corresponding to the respective parent individuals 71a and 71b are generated. In the example in FIG. 8, crossover processing is performed between the image filter F3 included in the parent individual 71a and the image filter F4 included in the parent individual 71b.

In addition, the fitness level calculated based on the parent individual 71a is "0.5," and the fitness level calculated based on the child individual corresponding to the parent individual 71a is "0.7." In addition, the fitness level calculated based on the parent individual 71b is "0.6," and the fitness level calculated based on the child individual corresponding to the parent individual 71b is "0.3."

In this case in the FIG. 8, as a result of the evolution processing on the parent individual 71a, the number of image filters F3 has been decreased by one, the number of image filters F4 has been increased by one, and the fitness level has been increased by "0.2." Thus, for example, the fitness level change registration unit 124 registers "0.2" as the value indicating the change of the fitness level in the record corresponding to "F3->F4" in the fitness level change table 151 in FIG. 6.

In addition, in the case in FIG. 8, as a result of the evolution processing on the parent individual 71b, the number of image filters F4 has been decreased by one, the number of image filters F3 has been increased by one, and the fitness level has been decreased by "0.3." Thus, for example, the fitness level change registration unit 124 registers "−0.3" as the value indicating the change of the fitness level in the record corresponding to "F4->F3" in the fitness level change table 151 in FIG. 6.

Figure 9:
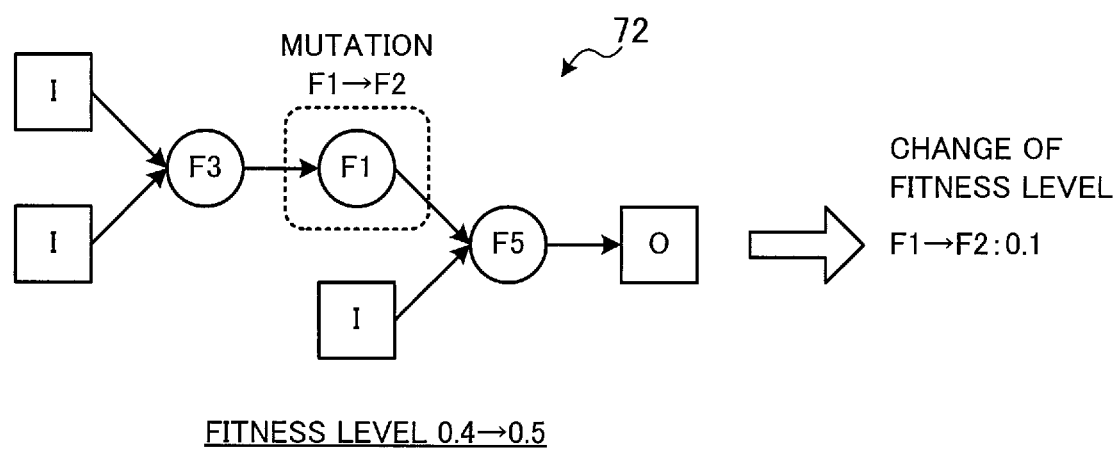
FIG. 9 illustrates a second example of the processing for registering change of a fitness level.

FIG. 9 illustrates a second example of the processing for registering change of a fitness level. In FIG. 9, a parent individual 72 includes image filters F1, F3, and F5. Mutation processing is performed on the parent individual 72, and a child individual (not illustrated) corresponding to the parent individual 72 is generated. In the example in FIG. 9, the image filter F1 included in the parent individual 72 is replaced by an image filter F2 in the mutation processing. In addition, the fitness level calculated based on the parent individual 72 is "0.4," and the fitness level calculated based on the child individual corresponding to the parent individual 72 is "0.5."

In this case in FIG. 9, as a result of the evolution on the parent individual 72, the number of image filters F1 has been decreased by one, the number of image filters F2 has been increased by one, and the fitness level has been increased by "0.1." Thus, for example, the fitness level change registration unit 124 registers "0.1" as the value indicating the change of the fitness level in the record corresponding to "F1->F2" in the fitness level change table 151 in FIG. 6.

When the fitness level change table 152 in FIG. 7 is used, in the cases in FIGS. 7 and 8, for example, the registration processing is performed as follows. First, for example, only for the types of image filter that have been increased in number as a result of evolution processing, the change of the fitness level is registered. In the case in FIG. 8, the fitness level change registration unit 124 registers "0.2" as the value indicating the change of the fitness level in the record corresponding to the image filter "F4" and registers "−0.3" as the value indicating the change of the fitness level in the record corresponding to the image filter "F3." In the case in FIG. 9, the fitness level change registration unit 124 registers "0.1" as the value indicating the change of the fitness level in the record corresponding to the image filter "F2."

In addition, for the types of image filter that have been decreased in number as a result of the evolution processing, the change of the fitness level may also be registered. In this case, since these types of image filter can be assumed to have a low contribution level with respect to the change of the fitness level as a result of the evolution processing, as the value indicating the change of the fitness level, for example, a value obtained by inverting the plus or minus of the amount of the change of the fitness level as a result of the evolution processing is registered. In the case in FIG. 8, for example, the fitness level change registration unit 124 registers "−0.2" as the value indicating the change of the fitness level in the record corresponding to the image filter "F3" and registers "0.3" as the value indicating the change of the fitness level in the record corresponding to the image filter "F4." In the case in FIG. 9, for example, the fitness level change registration unit 124 registers "−0.1" as the value indicating the change of the fitness level in the record corresponding to the image filter "F1."

The above examples in FIGS. 8 and 9 are simple examples in which one image filter is added and one filter is subtracted as a result of evolution processing. However, in actual evolution processing, for example, when crossover processing is performed, two or more image filters could be added or subtracted. For example, when two image filters have been added as a result of evolution processing and when the fitness level has been increased by "0.2," each of the added two image filters can be assumed to have contributed to half of the increase "0.2" of the fitness level. The fitness level change registration unit 124 may calculate the value indicating the change of the fitness level in view of the number of image filters added and the number of image filters subtracted as a result of evolution processing.

Figure 10:
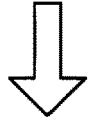
FIG. 10 illustrates an example of change of image filters as a result of evolution processing.

In the following description, first, FIG. 10 illustrates an example of change of image filters as a result of evolution processing. Next, an example of processing for registering change of a fitness level by using the example in FIG. 10 will be described with reference to FIGS. 11A to 11C and 12A to 12C.

FIG. 10 illustrates an example of change of image filters as a result of evolution processing. A table 81 in FIG. 10 illustrates an example of configurations of pre- and post-evolution individuals and an example of the change of the fitness level as a result of evolution processing. In the example in the table 81, the parent individual includes three image filters F1, two image filters F2, two image filters F3, and three image filters F4. In addition, the child individual generated by the evolution of this parent individual includes two image filters F1, three image filters F2, two image filters F3, one image filter F4, and three image filters F5. In addition, the fitness level calculated based on the parent individual is "0.5," and the fitness level calculated based on the child individual is "0.7."

When the evolution has changed the configuration of the parent individual as illustrated in the table 81, the fitness level change registration unit 124 extracts the difference between the number of image filters of an individual type in the pre-evolution individual and the number of image filters of the corresponding type in the post-evolution individual. The differences based on the table 81 are extracted as illustrated in the table 82 in FIG. 10. Namely, as a result of the evolution processing, one image filter F1 has been subtracted, and one image filter F2 has been added. In addition, two image filters F4 have been subtracted, and three image filters F5 have been added. The number of image filters F3 has not been changed.

FIGS. 11A to 11C illustrate a third example of the processing for registering change of a fitness level. FIGS. 11A to 11C assume that the fitness level change registration unit 124 registers change of a fitness level in the fitness level change table 152 in FIG. 7.

FIG. 11A illustrates an example in which only the types of image filters that have been increased in number as a result of evolution processing are registered. As illustrated in the table 82 in FIG. 10, one image filter F2 and three image filters F5 have been added as a result of the evolution processing. Thus, the fitness level change registration unit 124 registers the change of the fitness level in the records corresponding to the image filters F2 and F5 among the records in the fitness level change table 152. In the example in FIG. 11A, the fitness level change registration unit 124 registers the increased amount "0.2" of the fitness level obtained as a result of the evolution processing in the records corresponding to the image filters F2 and F5 without change.

FIG. 11B illustrates an example in which the types of image filters that have been decreased in number as a result of the evolution processing are also registered, in addition to the types of image filters described in FIG. 11A. As illustrated in the table 82 in FIG. 10, one image filter F1 and two image filters F4 have been subtracted as a result of the evolution processing. Thus, the fitness level change registration unit 124 also registers the change of the fitness level in the records corresponding to the image filters F1 and F4 among the records in the fitness level change table 152. In the example in FIG. 11B, the fitness level change registration unit 124 register "−0.2," which is a value obtained by inverting the plus or minus of the increased amount of the fitness level obtained as a result of the evolution processing, in the records corresponding to the image filters F1 and F4.

FIG. 11C illustrates an example in which change of a fitness level is defined based on the number of image filters of an individual type changed as a result of the evolution processing. In the example in FIG. 11C, as in FIG. 11B, not only the records corresponding to the types of image filters that have been increased in number as a result of the evolution processing, the records corresponding to the types of image filters that have been decreased in number as a result of the evolution processing are also used as the fitness level change registration targets.

For example, regarding a type of image filter that has been increased in number as a result of evolution processing, the fitness level change registration unit 124 calculates the change of the fitness level in accordance with the following formula (1).

"Change of fitness level"="increased amount of fitness level"/("number of types of image filters that have been increased in number"×"number of image filters added to target image filter")  (1)

For example, regarding the image filters F2, the fitness level change registration unit 124 calculates the change of the fitness level as $(0.7-0.5)/(2\times1)=0.1$.

In addition, for example, regarding a type of image filter that has been decreased in number as a result of evolution processing, the fitness level change registration unit 124 calculates the change of the fitness level in accordance with the following formula (2).

"Change of fitness level"=(−1)×"increased amount of fitness level"/("number of types of image filters that have been decreased in number"×"number of image filters subtracted from target image filter")  (2)

For example, regarding the image filter F1, the fitness level change registration unit 124 calculates the change of the fitness level as $(-1)\times(0.7-0.5)/(2\times1)=-0.1$.

As illustrated in the example in FIG. 11C, by defining the change of the fitness level on the basis of the number of image filters of an individual type changed as a result of evolution processing, compared with the examples illustrated in FIGS. 11A and 11B, the fitness level change registration unit 124 can more accurately reflect how much each image filter affects the amount of the change of a fitness level as a result of evolution processing on each fitness value to be registered. Consequently, an individual contribution level with respect to the increase of the fitness level can accurately be reflected on the selection probability per image filter, and the chance that the time needed for the program generation processing can be shortened is increased.

Figure 12A:
FIGS. 12A to 12C illustrate a fourth example of the processing for registering change of a fitness level.
Figure 12B:
Figure 12C:

FIGS. 12A to 12C illustrate a fourth example of the processing for registering change of a fitness level. FIGS. 12A to 12C assume that the fitness level change registration unit 124 registers change of a fitness level in the fitness level change table 151 in FIG. 6.

In the tables in FIGS. 12A to 12C, image filters arranged in the vertical direction are image filters that have been decreased in number as a result of evolution processing, and image filters arranged in the horizontal direction are image filters that have been increased in number as a result of the evolution processing. In addition, each of the left-side tables in FIGS. 12A to 12C illustrates the number of image filters added, and FIG. 12B illustrates the number of image filters added and the number of image filters subtracted. Each of the right-side tables in FIGS. 12A to 12C illustrates change of a fitness level.

Regarding each of the right-side tables, a combination of any one of the image filters arranged in the vertical direction and any one of the image filters arranged in the horizontal direction forms a single record in the fitness level change table 151. For example, a combination of an image filter F1 in the vertical direction and an image filter F2 in the horizontal direction forms a record corresponding to "F1->F2" in the fitness level change table 151 (namely, a record indicating that the number of image filters F1 has been decreased and the number of image filters F2 has been increased).

FIG. 12A illustrates an example in which change of a fitness level is registered in an individual record corresponding to a combination of a type of image filter that has been decreased in number and a type of image filter that has been increased in number. As illustrated in the table 82 in FIG. 10, the number of image filters F2 and the number of image filters F5 have been increased as a result of the evolution processing. In addition, the number of image filters F1 and the number of image filters F4 have been decreased. Thus, the fitness level change registration unit 124 registers the change of the fitness level in the records corresponding to "F1->F2," "F4->F2," "F1->F5," and "F4->F5" among the records in the fitness level change table 151.

In the example in FIG. 12A, as illustrated in the left-side table, the number of image filters added is not considered. In this table, "1" is consistently registered as the number of image filters added. The number of image filters added and the number of image filters subtracted are not reflected on the change of the fitness level. In this case, as illustrated in the right-side table in FIG. 12A, the fitness level change registration unit 124 directly registers the increased amount "0.2" of the fitness level obtained as a result of the evolution processing in the records corresponding to "F1->F2," "F4->F2," "F1->F5," and "F4->F5."

FIG. 12B illustrates an example in which the change of the fitness level is also registered in an individual record corresponding to a combination of a type of image filter that has been increased in number and a type of image filter that has been decreased in number, in addition to the example in FIG. 12A. The fitness level change registration unit 124 registers a negative value indicating the change of the fitness level in the records corresponding to "F2->F1," "F2->F4," "F5->F1," and "F5->F4" among the records in the fitness level change table 151.

In the example in FIG. 12B, as FIG. 12A, as illustrated in the left-side table, the number of image filters subtracted is not considered. In this table, "1" is consistently registered as the number of image filters subtracted. The number of image filters added and the number of image filters subtracted are not reflected on the change of the fitness level. In this case, as illustrated in the right-side table in FIG. 12B, the fitness level change registration unit 124 registers a value "−0.2" obtained by inverting the plus or minus of the amount of the change of the fitness level as a result of the evolution processing in the records corresponding to "F2->F1," "F2->F4," "F5->F1," and "F5->F4."

FIG. 12C illustrates an example obtained by changing the example in FIG. 12A. In FIG. 12C, the change of the fitness level is defined based on the number of image filters of an individual type added and the number of image filters of an individual type subtracted. First, the fitness level change registration unit 124 defines the number of image filters of an individual type added by using the number of image filters of an individual type subtracted.

For example, the number of image filters F2 added and the number of image filters F5 added are "1" and "3," respectively. In addition, the number of image filters F1 subtracted and the number of image filters F4 subtracted are "1" and "2," respectively. Thus, the fitness level change registration unit 124 calculates the number of filters added that corresponds to the record "F1->F2" and the number of filters added that corresponds to the record "F4->F2" in such a manner that these numbers match the ratio of the number of image filters F1 subtracted and the number of image filters F4 subtracted with reference to the number "1" of image filters F2 added. Thus, as illustrated in the left-side table in FIG. 12C, the fitness level change registration unit 124 calculates "1" and "0.5" as the number of filters added that corresponds to the record "F1->F2" and as the number of filters added that corresponds to the record "F4->F2," respectively.

Likewise, the fitness level change registration unit 124 calculates the number of filters added that corresponds to the record "F1->F5" and the number of filters added that corresponds to the record "F4->F5" in such a manner that these numbers match the ratio of the number of image filters F1 subtracted and the number of image filters F4 subtracted with reference to the number "3" of image filters F5 added. Thus, as illustrated in the left-side table in FIG. 12C, the fitness level change registration unit 124 calculates "3" and "1.5" as the number of filters added that corresponds to the record "F1->F5" and as the number of filters added that corresponds to the record "F4->F5," respectively.

Next, the fitness level change registration unit 124 calculates the change of the fitness level that corresponds to an individual record, on the basis of the number of filters added that corresponds to an individual record. For example, the fitness level change registration unit 124 defines the increased amount "0.2" of the fitness level by using an individual number of filters added that has been calculated by the above processing.

For example, the fitness level change registration unit 124 calculates the change of the fitness level to be registered in a record in accordance with the following formula (3) obtained by changing the above formula (1).

"Change of fitness level"="increased amount of fitness level"/("number of types of filters that have been changed in number"×"number of filters added on target record")     (3)

For example, as illustrated in the right-side table in FIG. 12C, the change of the fitness level registered in the record corresponding to "F1->F2" is calculated to be (0.7−0.5)/(4× 1)=0.5.

As illustrated in the example in FIG. 12C, by defining the change of the fitness level on the basis of the number of image filters changed as a result of the evolution processing, compared with the example illustrated in FIG. 12A, the fitness level change registration unit 124 can more accurately reflect how much each image filter affects the amount of the change of the fitness level as a result of the evolution processing on each fitness value to be registered. Consequently, an individual contribution level with respect to the increase of the fitness level can accurately be reflected on the selection probability per image filter, and the chance that the time needed for the program generation processing can be shortened is increased.

In FIGS. 11A to 11C and 12C, "0" is registered in each of the records corresponding to the image filters that have not been changed in number as a result of the evolution processing. In actual registration processing, in an individual record in the fitness level change table that corresponds to a type of image filter that has not been changed in number as a result of evolution processing, the value "0" may or may not be registered as the change of the fitness level.

Next, an example of processing for setting the selection probabilities by the selection probability setting unit 125 will be described with reference to FIGS. 13A to 13C and 14. The selection probability setting unit 125 calculates an effectiveness level per image filter on the basis of the changes of the fitness levels registered in the fitness level change storage unit 160 within a predetermined time. Each effectiveness level is an estimated value indicating how much an image filter is effective in (contributes to) increasing the corresponding fitness level. The selection probability setting unit 125 calculates a selection probability per image filter on the basis of the calculated effectiveness levels, and sets the calculated selection probabilities in association with the respective image filters in the filter set database 141.

FIGS. 13A to 13C illustrate examples of cumulative histograms indicating changes of fitness levels. An example of processing for calculating an effectiveness level by using a cumulative histogram indicating change of a fitness level will be described with reference to FIGS. 13A to 13C. FIGS. 13A to 13C assume using the changes of the fitness levels registered in the fitness level change table 151 in FIG. 6. In addition, a value between "0" and "1" is used as the fitness level calculated by evolution processing.

A first example in FIG. 13A illustrates a cumulative histogram indicating change of a fitness level registered in a record corresponding to "F1->F2" in the fitness level change table 151. In the example in FIG. 13A, the peak in the cumulative histogram exists in a region where the change of the fitness level is positive, and the number of times corresponding to the peak is over a predetermined threshold Th1.

In this case, the image filter F2 is estimated to contribute to increasing the fitness level, and the value of the peak position can be thought of as its contribution level. Thus, the selection probability setting unit 125 calculates the value of the peak position in the cumulative histogram ("0.5" in the example in FIG. 13A) as the effectiveness level of the image filter F2. Alternatively, the selection probability setting unit 125 may calculate an average value in the cumulative histogram as the effectiveness level of the image filter F2.

In reality, the fitness level change table 151 includes a plurality of records, in each of which the image filter F2 is set as a type of image filter that has been increased in number as a result of evolution processing. For example, when n image filters exist, the fitness level change table 151 includes (n−1) records corresponding to "F1->F2," "F3->F2," to "Fn->F2." The selection probability setting unit 125 determines the value of the peak position in the cumulative histogram from each of the (n−1) records and calculates the average value of all the determined values as the effectiveness level of the image filter F2.

After calculating the effectiveness level per image filter in accordance with the above procedure, the selection probability setting unit 125 calculates the selection probability per image filter on the basis of the calculated effectiveness levels. When an image filter is randomly selected from the n image filters (namely, with the same selection probability), the selection probability of this image filter is "1/n." Thus, for example, when calculating the selection probability of an image filter, if the effectiveness level of the image filter is over the average value of the effectiveness levels of all the image filters, the selection probability of the image filter may be set higher than "1/n". In addition, if the effectiveness level of the image filter falls below the average value of the effectiveness levels of all the image filters, the selection probability of the image filter may be set lower than "1/n." For example, the selection probability of an image filter is calculated in accordance with the following formula (4).

"Selection probability"=(1/n)×("effectiveness level of target image filter"−"average value of effectiveness levels of all image filters")×0.5       (4)

A second example in FIG. 13B illustrates a cumulative histogram indicating change of a fitness level registered in a record corresponding to "F2->F1" in the fitness level change table 151. While the peak value in the cumulative histogram is over the threshold Th1 in the example in FIG. 13B, the peak position exists in a region where the change of the fitness level is negative.

In this case, too, the selection probability setting unit 125 may calculate the value of the peak position in the cumulative histogram as the effectiveness level of the image filter F1. However, when the value of the effectiveness level is low, it is more likely that the image filter F1 that has been increased in number does not contribute to increasing the fitness level.

Thus, when the value of the effectiveness level is equal to or less than a predetermined value (for example, "0"), the selection probability setting unit 125 may set the selection probability of the target image filter to a predetermined minimum value. In this way, when subsequent evolution processing is performed, an image filter that does not contribute to increasing the fitness level is selected with a lower probability, and the calculated fitness level reaches a high value more quickly.

Alternatively, the selection probability setting unit 125 may remove such image filters from the selection targets in the evolution processing. Alternatively, to remove such image filters from the selection targets, "0" may be set as the selection probability of these image filters. By preventing these image filters that do not contribute to increasing the fitness level from being newly selected in the evolution processing, the chance that the fitness level reaches a high value more quickly is increased.

A third example in FIG. 13C illustrates a cumulative histogram indicating change of a fitness level registered in a record corresponding to "F3->F4" in the fitness level change table 151. In the example in FIG. 13C, the change of the fitness level registered ranges in a wide region, and no peak values in the cumulative histogram are over the threshold Th1. In this case, it is estimated that the image filter F4 does not significantly contribute to increasing the fitness level. Thus, for example, the selection probability setting unit 125 sets the effectiveness level of the image filter F4 to a predetermined minimum value (for example, "−1") and sets a low value as the selection probability of the image filter F4.

FIG. 13C assumes that the selection probability setting unit 125 uses the cumulative histograms based on the fitness level change table 151 in FIG. 6, the selection probability setting unit 125 may use cumulative histograms based on the fitness level change table 152 in FIG. 7.

FIG. 14 illustrates another example of processing for setting selection probabilities. FIG. 14 also assumes that the selection probability setting unit 125 uses the changes of the fitness levels registered in the fitness level change table 151 in FIG. 6.

In the table in FIG. 14, image filters arranged in the vertical direction are image filters Fm (m=1 to 5) that have been decreased in number as a result of evolution processing, and image filters arranged in the horizontal direction are image filters Fn (n=1 to 5) that have been increased in number as a result of the evolution processing. In addition, a single record in the fitness level change table 151 is determined by a combination of one of the image filters Fm arranged in the vertical direction and one of the image filters Fn arranged in the horizontal direction. In FIG. 14, in a box associated with a single image filter Fm and a single image filter Fn, the average value of the changes of the fitness levels registered in the corresponding records is set.

For example, the selection probability setting unit 125 obtains an average value of these averages values of the changes of the fitness levels per image filter Fn. In this way, the selection probability setting unit 125 calculates the effectiveness level of an image filter Fn. For example, the selection probability setting unit 125 calculates the effectiveness level of the image filter F1 as "(−0.40−0.20−0.10−0.20)/4=−0.225." In addition, the selection probability setting unit 125 calculates the selection probability per image filter Fn in accordance with the above formula (4).

In the example in FIG. 14, the effectiveness levels of the image filters F1 and F4 are values less than "0." For example, when the effectiveness level of an image filter is equal to or less than a predetermined threshold (for example, "0"), the selection probability setting unit 125 may set "0" as the selection probability of the image filter. In this way, the image filter is removed from the selection targets in the evolution processing.

Figure 15:
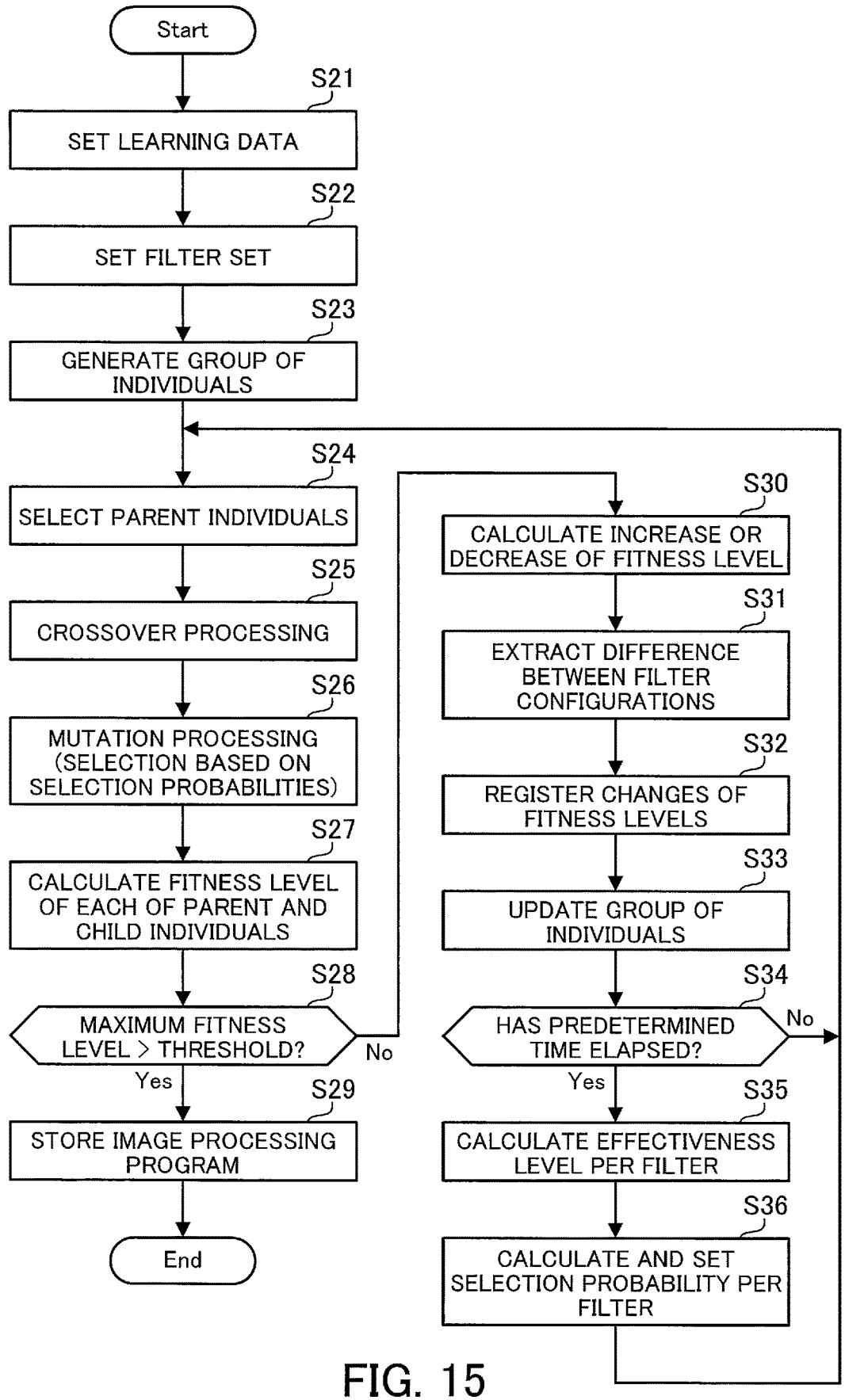
FIG. 15 is a flowchart illustrating an example of a procedure of program generation processing.

Next, a procedure of the program generation processing according to the second embodiment will be described with reference to a flowchart. FIG. 15 is a flowchart illustrating an example of a procedure of program generation processing.

[Step S21] The learning control unit 121 receives an input operation of setting learning data. For example, the learning data used in the present processing is specified from the learning data stored in the learning data storage unit 150.

[Step S22] The learning control unit 121 receives an input operation of setting a filter set. For example, the image filters used in the present processing are specified from the image filters registered in the filter set database 141.

[Step S23] The learning control unit 121 generates a group of individuals including a predetermined number of individuals. Each individual is generated by randomly selecting and combining image filters from the image filters specified in step S22. The group of individuals generated corresponds to the group of individuals 61 illustrated in FIG. 2, and therefore, this group of individuals will hereinafter be referred to as "the group of individuals 61."

[Step S24] The learning control unit 121 randomly selects two parent individuals from the individuals included in the group of individuals 61.

[Step S25] By performing crossover processing between the selected two parent individuals, the learning control unit 121 generates a predetermined number of child individuals, which are two or more child individuals.

[Step S26] The learning control unit 121 performs mutation processing on the generated child individuals. In this processing, one of the image filters included in a child individual is replaced with another image filter specified in step S22. The learning control unit 121 selects this substituting image filter on the basis of the selection probabilities associated with the image filters in the filter set database 141. Namely, the selection processing is performed in such a manner that an image filter with a higher selection probability is more likely to be newly included in a child individual in the next mutation processing.

[Step S27] The fitness level calculation unit 123 calculates the fitness level of each of the parent individuals selected in step S24 and the fitness level of each of the child individuals obtained by the processing in steps S26 and S27. In this processing, each calculation target individual is processed as follows.

The image processing unit 122 selects one learning data specified in step S21 and applies the processing of the calculation target individual to the input image included in the selected learning data. The fitness level calculation unit 123 calculates a fitness level by calculating a conformity level between the image obtained by the processing of the individual and the corresponding target image included in the selected learning data. The image processing unit 122 and the fitness level calculation unit 123 perform the above processing on all the learning data specified in step S21. The fitness level calculation unit 123 calculates an average value of all the fitness levels calculated and outputs this average value as the fitness level of the calculation target individual.

[Step S28] The learning control unit 121 determines whether the maximal value of the fitness levels of the individuals calculated in step S27 is larger than a predetermined threshold. If the maximal value of the fitness levels is larger than the threshold, the operation proceeds to step S29. However, if the maximal value of the fitness levels is equal to or less than the threshold, the operation proceeds to step S30.

[Step S29] The learning control unit 121 selects the individual with the maximum fitness level from the individuals whose fitness levels have been calculated in step S27. The learning control unit 121 stores the image processing program indicated by the selected individual in the program storage unit 130 and ends the program generation processing.

[Step S30] By associating each child individual obtained by the processing in steps S25 and S26 with the original parent individuals corresponding to the child individual, the fitness level change registration unit 124 generates a plurality of pairs of parent and child individuals. The fitness level change registration unit 124 calculates the increase or decrease of the fitness level for each of the pairs of individuals generated. The increase or decrease of the fitness level is calculated as a value obtained by subtracting the fitness level of the parent individual from the fitness level of the child individual.

[Step S31] For each of the pairs of individuals generated, the fitness level change registration unit 124 extracts the difference between their filter configurations. In this processing, the fitness level change registration unit 124 determines, per pair, a type of image filter that has been decreased in number between the parent and child individuals, the number of image filters decreased, a type of image filter that has been increased in number between the parent and child individuals, the number of image filters added.

[Step S32] On the basis of the information about the increases and decreases of the fitness levels calculated in step S30 and about the difference between the filter configurations extracted in step S31, the fitness level change registration unit 124 calculates change of the fitness level per image filter and registers these changes in the fitness level change storage unit 160.

The fitness level change calculation method is as described with reference to FIGS. 8 to 12. In addition, when the fitness level change table 151 in FIG. 6 is used, a value indicating change of a fitness level is registered in a record given to a combination of a type of image filter that has been decreased in number and a type of image filter that has been increased in number. In contrast, when the fitness level change table 152 in FIG. 7 is used, a value indicating change of a fitness level is registered in a record given per image filter.

[Step S33] The learning control unit 121 selects an individual with the highest fitness level as an individual allowed to survive from the parent individuals selected in step S24 and the child individuals obtained by the processing in steps S26 and S27. In addition, the learning control unit 121 selects one more individual allowed to survive from the remaining individuals. In this selection processing, for example, an individual is selected based on the probabilities based on the calculated fitness levels.

Among the individuals in the group of individuals 62, the learning control unit 121 replaces the two individuals selected in step S24 with the two individuals selected as the individual allowed to survive. In this way, the generation of the group of individuals 62 is updated.

[Step S34] The learning control unit 121 determines whether a predetermined time has elapsed. If the predetermined time has elapsed, the operation proceeds to step S35. However, if the predetermined time has not elapsed, the operation proceeds to step S24. After performing step S34, the count value measuring the predetermined time is reset.

In this processing in step S34, for example, the learning control unit 121 determines that the predetermined time has elapsed when the processing from step S24 to step S33 has been repeated a predetermined number of times (namely, when evolution processing has been performed for a predetermined number of generations). Alternatively, when the number of data indicating the changes of the fitness levels accumulated in the fitness level change storage unit 160 reaches a predetermined number, the learning control unit 121 may determine that the predetermined time has elapsed.

[Step S35] On the basis of the changes of the fitness levels registered in the fitness level change storage unit 160 within the predetermined time determined in step S34, the selection probability setting unit 125 calculates an effectiveness level per image filter. The effectiveness level is calculated as described with reference to FIGS. 13A to 13C and 14.

[Step S36] The selection probability setting unit 125 calculates the selection probabilities of the image filters on the basis of the effectiveness levels calculated in step S35. The selection probability setting unit 125 calculates the selection probabilities in accordance with the above formula (4), for example. In addition, the selection probability setting unit 125 may set "0" as the selection probability for the image filters whose effectiveness level is equal to or less than a predetermined threshold. These image filters whose selection probability has been set to "0" are removed from the selection targets in the subsequent processing in step S26.

The selection probability setting unit 125 sets the calculated selection probabilities in the filter set database 141. The values of the selection probabilities registered in the filter set database 141 are updated by the values of the newly calculated selection probabilities.

In the second embodiment, the image processing device 100 accumulates information about changes of fitness levels and changes of filter configurations between pre- and post-evolution individuals and calculates, per image filter, an effectiveness level with respect to the increase of the corresponding fitness level on the basis of the accumulated information. Next, the image processing device 100 sets, to each image filter, a selection probability based on the corresponding effectiveness level calculated. When performing mutation in subsequent evolution processing, the image processing device 100 selects an image filter to be included in a child individual in accordance with the set selection probabilities. In this way, in subsequent evolution processing, an image filter that contributes to increasing the fitness level is more likely to be included in a child individual. As a result, since a higher fitness level is more likely to be calculated, the fitness level is more likely to reach a high value. Thus, the time needed for processing for generating an image processing program is more likely to be shortened.

In addition, even when the number of selectable image filters is increased and the number of learning data to be referred to is increased, the chance that the time needed for the program generation processing is extended is reduced. As a result, the chance that a high-quality image processing program is generated within a short time is increased.

Third Embodiment

If, as in the second embodiment, the selection probabilities of the image filters that are estimated to contribute to increasing the corresponding fitness level are increased, the learning rate is increased. However, the chance that an individual solution search ends up in a local solution search is increased. In the local solution search, the solution searches converge to a local solution that is different from an optimum solution. In such cases, it is a good idea to change the selection of an image filter to random selection again. In this way, the solution search range can be expanded, and the next solution search is performed more comprehensively.

Thus, an image processing device according to a third embodiment includes a function of switching the selection mode between a selection mode in which an image filter is selected in accordance with the selection probabilities set in the filter set database 141 and a selection mode in which an image filter is randomly selected in evolution processing, in addition to the functions of the image processing device 100 according to the second embodiment. The image processing device according to the third embodiment determines the trend of the transition of the fitness level between parent and child individuals in evolution processing and switches the selection mode on the basis of the determination result.

Hereinafter, the selection mode in which an image filter is selected in accordance with the selection probabilities set in the filter set database 141 will be referred to as "a non-random selection mode," and the selection mode in which an image filter is randomly selected will be referred to as "a random selection mode."

Figure 16:
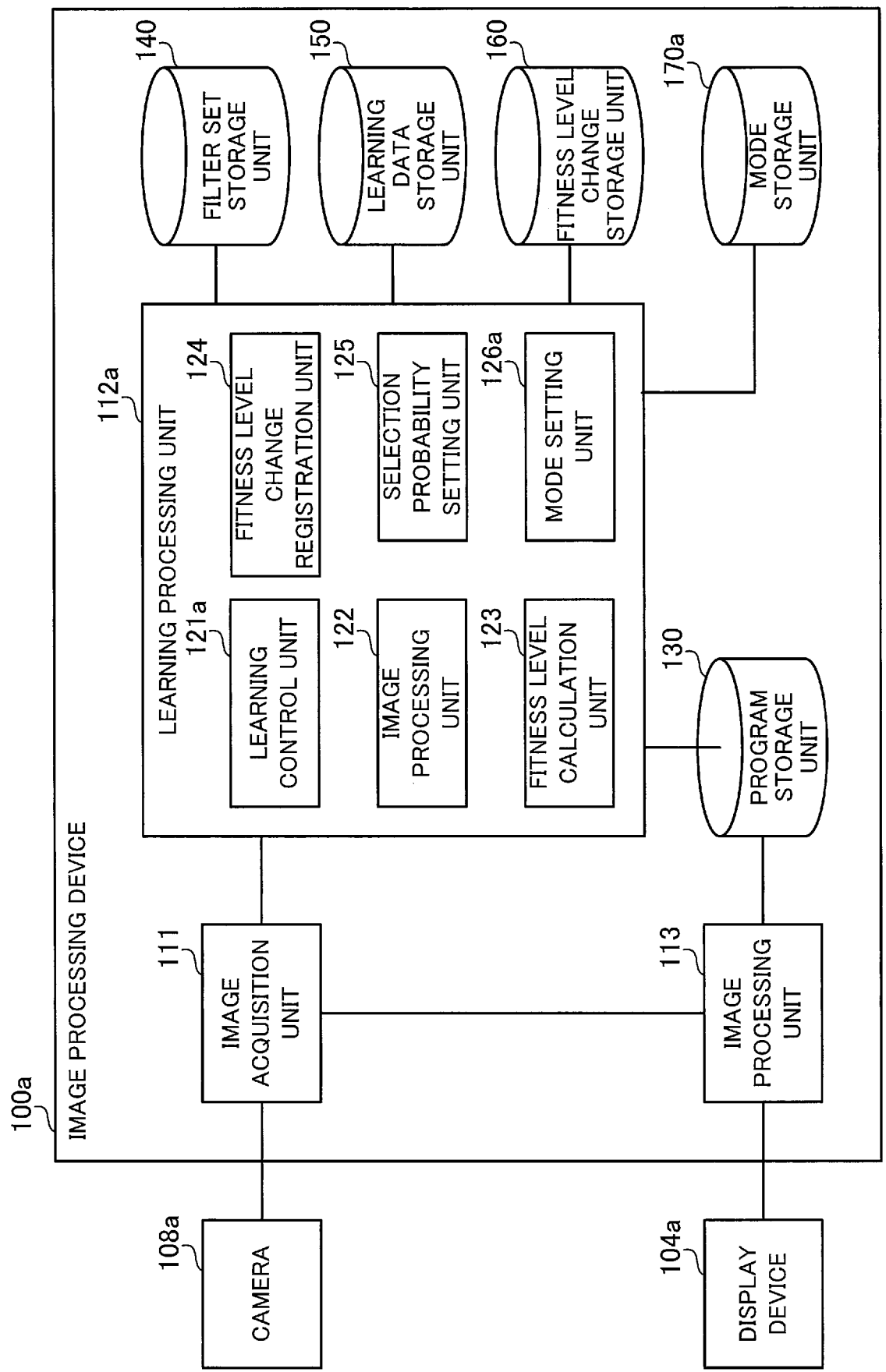
FIG. 16 is a block diagram illustrating a configuration example of processing functions of an image processing device according to a third embodiment.

FIG. 16 is a block diagram illustrating a configuration example of processing functions of the image processing device according to the third embodiment. The image processing device in FIG. 16 includes the same components as those in FIG. 4. Thus, these components will be denoted by the same reference characters, and description thereof will be omitted.

An image processing device 100a illustrated in FIG. 16 is realized by replacing the learning processing unit 112 of the processing functions of the image processing device 100 in FIG. 4 with a learning processing unit 112a and additionally arranging a mode storage unit 170a. The mode storage unit 170a includes information indicating which one of the random selection mode and the non-random selection mode is currently set.

The learning processing unit 112a includes a learning control unit 121a in place of the learning control unit 121 in FIG. 4. While the learning control unit 121a basically performs the same processing as that of the learning control unit 121 in FIG. 4, the learning control unit 121a differs from the learning control unit 121 in that the learning control unit 121a selects an image filter in accordance with the selection mode set in the mode storage unit 170a when performing mutation processing.

In addition, the learning processing unit 112a includes a mode setting unit 126a in addition to the image processing unit 122, the fitness level calculation unit 123, the fitness level change registration unit 124, and the selection probability setting unit 125 included in the learning processing unit 112 in FIG. 4. The mode setting unit 126a determines the trend of the transition of the fitness level between parent and child individuals through evolution processing, switches the selection mode on the basis of the determination result, and sets the selection mode in the mode storage unit 170a.

Figure 17:
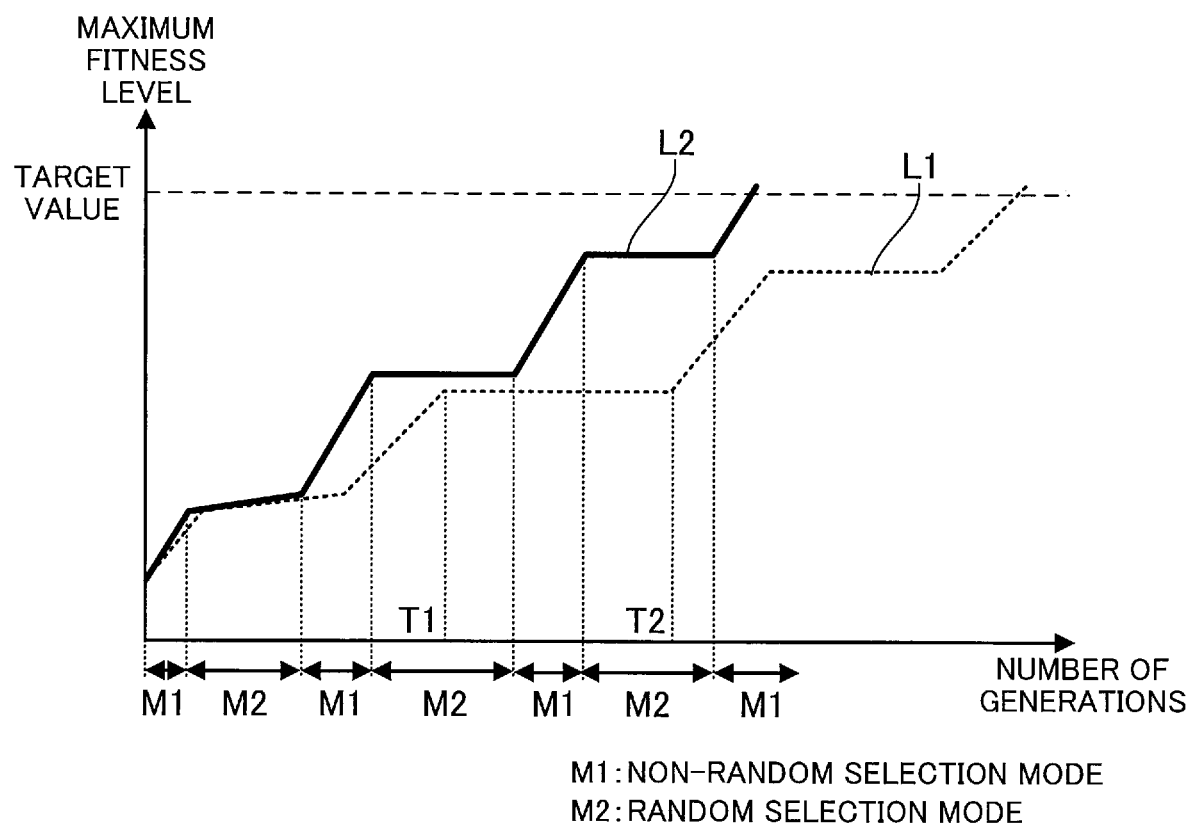
FIG. 17 illustrates selection mode setting processing.

FIG. 17 illustrates selection mode setting processing. FIG. 17 is a graph illustrating transition of the maximal value of the fitness levels (maximum fitness level) calculated in evolution processing. A polygonal line L1 which is a dotted line in FIG. 17 indicates the transition of the maximum fitness level when the program generation processing is performed in the non-random selection mode. As illustrated in this polygonal line L1, even when the non-random selection mode is set, the maximum fitness level does not always continue to increase. For example, as in the period between timing T1 and timing T2 in FIG. 17, the increase rate could remain at the same level. One conceivable reason why the increase rate of the maximum fitness level remains at the same level is that the solution searches end up in a local solution search as described above. In such cases, the chance that the increase rate of the maximum fitness level is improved is increased by switching the selection mode to the random selection mode so that the next solution search is performed more comprehensively.

Thus, the mode setting unit 126a calculates the increase rate of the maximum fitness level on the basis of the maximum value of the fitness levels calculated in the processing corresponding to a predetermined number of previous generations. If the increase rate of the maximum fitness level is equal to or more than a predetermined threshold (the threshold is over "0"), the mode setting unit 126a sets the selection mode to the non-random mode. If the increase rate is less than the threshold, the mode setting unit 126a sets the selection mode to the random mode. In this way, as illustrated in a polygonal line L2 which is a bold line in FIG. 17, it is more likely that the period in which the increase rate of the maximum fitness level remains at the same level is shortened. Thus, it is more likely that less time is needed for the maximum fitness level to reach a predetermined target value.

Figure 18:
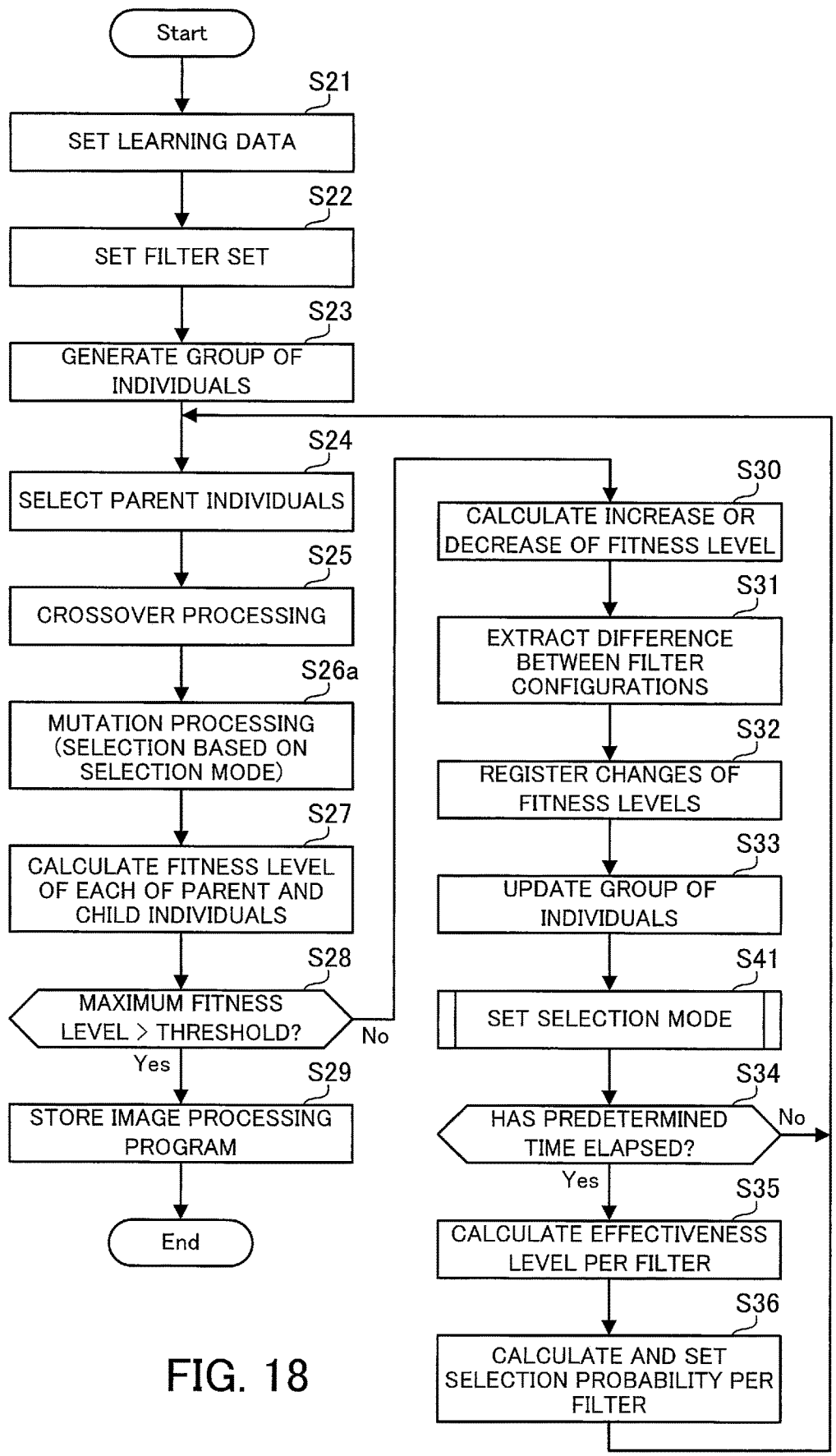
FIG. 18 is a flowchart illustrating an example of a procedure of program generation processing according to the third embodiment.

FIG. 18 is a flowchart illustrating an example of a procedure of program generation processing according to the third embodiment. FIGS. 18 and 15 include the same steps. Thus, in FIG. 18, these steps will be denoted by the same reference characters, and description of the same processing contents will be omitted. The processing performed by the learning control unit 121 in FIG. 15 is performed by the learning control unit 121a in FIG. 18.

In FIG. 18, step S26a is performed in place of step S26 in FIG. 15. In addition, step S41 is performed between steps S33 and S34 in FIG. 15.

[Step S26a] The learning control unit 121a performs mutation processing on the generated child individuals. In this processing, one of the image filters included in a child individual is replaced with another image filter specified in step S22. In this processing, the learning control unit 121a refers to the mode storage unit 170a and recognizes the current selection mode. If the current selection mode is the random mode, the learning control unit 121a randomly selects a substituting image filter. In contrast, if the current selection mode is the non-random mode, the learning control unit 121a selects a substituting image filter on the basis of the selection probabilities associated with the image filters in the filter set database 141.

[Step S41] The mode setting unit 126a sets the selection mode. This processing will be described with reference to FIG. 19.

Figure 19:
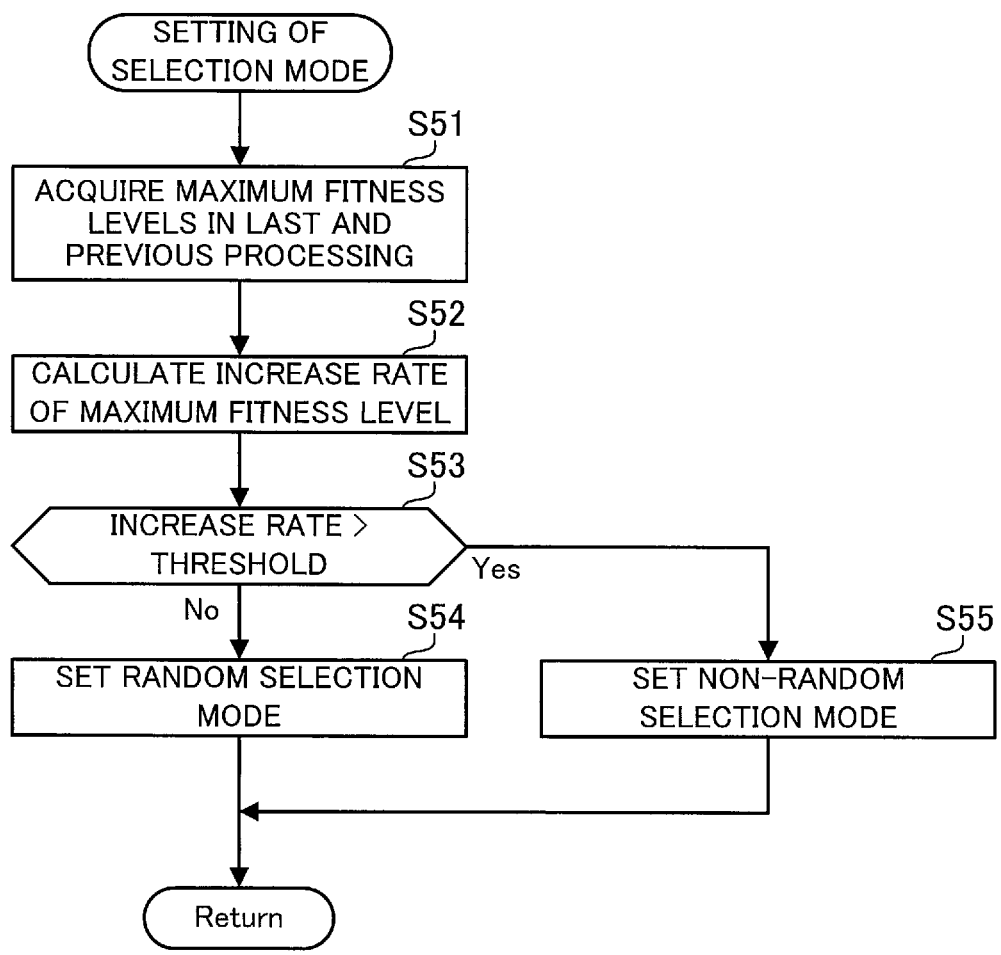
FIG. 19 is a flowchart illustrating an example of a procedure of the selection mode setting processing.

FIG. 19 is a flowchart illustrating an example of a procedure of the selection mode setting processing.

[Step S51] The mode setting unit 126a acquires the maximal fitness level calculated in the current-generation processing (namely, the processing in the last step S27) and the maximal value of the fitness levels calculated in the processing corresponding to a predetermined number of previous generations. For example, these maximum fitness levels can be acquired from a log (not illustrated) in which the calculated fitness levels are stored or from the information in the fitness level change storage unit 160.

[Step S52] The mode setting unit 126a calculates the increase rate of the extracted maximum fitness level. For example, the increase rate is calculated by subtracting the maximum fitness level in the previous-generation processing from the maximum fitness level in the current-generation processing and dividing the subtraction result by the difference in the generation number (namely, the number of repetitions of step S27 from the previous generation to the current generation).

[Step S53] The mode setting unit 126a compares the calculated increase rate with a predetermined threshold larger than "0." If the increase rate is equal to or less than the threshold, step S54 is performed. If the increase rate is over the threshold, step S55 is performed.

[Step S54] The mode setting unit 126a updates the selection mode set in the mode storage unit 170a to the random selection mode.

[Step S55] The mode setting unit 126a updates the selection mode set in the mode storage unit 170a to the non-random selection mode.

In the above third embodiment, the image processing device 100a determines that the fitness level is steadily increasing, the image processing device 100a selects an image filter used in the next mutation processing according to the selection probabilities set to the respective image filters. However, if the image processing device 100a determines that the increase rate of the maximum fitness level remains at the same level for a while, the image processing device 100a randomly selects an image filter used in the next mutation processing. In this way, the chance that the calculated maximum fitness level increases is increased, and the fitness level reaches a high value more quickly. As a result, the chance that less time is needed for the processing for generating an image processing program is increased.

In the above processing, the mode setting unit 126a determines whether the increase rate of the maximum fitness level is larger than a threshold. In addition, based on the determination result, the mode setting unit 126a determines whether to select an image filter randomly or according to the set selection probabilities. However, alternatively, the mode setting unit 126a may change weight added to the set selection probabilities, depending on whether the increase rate of the maximum fitness level is larger than a threshold. In this way, when the next mutation processing is performed, an image filter is selected according to the selection probabilities on which the weighting has been performed.

For example, in step S53 in FIG. 19, when the increase rate is less than the threshold, the mode setting unit 126a decreases a value indicating the weight by a predetermined value or ratio. As a result, the selection of an image filter in the next mutation processing is performed more randomly, and the next solution search is performed more comprehensively. In contrast, when the increase rate is equal to or more than the threshold, the mode setting unit 126a increases the value indicating the weight by a predetermined value or ratio. As a result, an image filter determined to have a higher contribution level with respect to the increase of the fitness level is more likely to be selected in the next mutation processing. The value indicating the weight is set in the range between "0" and "1."

Even such processing is performed, as in the above third embodiment, the chance that the calculated maximum fitness level increases is increased, and the fitness level reaches a high value more quickly.

Fourth Embodiment

An image processing device according to a fourth embodiment differs from the image processing device 100a according to the third embodiment in that the contents of the selection modes and the switching conditions thereof.

Since the basic configuration of the processing functions of the image processing device according to the fourth embodiment is the same as that according to the third embodiment, the image processing device according to the fourth embodiment will be described by using the reference characters in FIG. 16.

Figure 20:
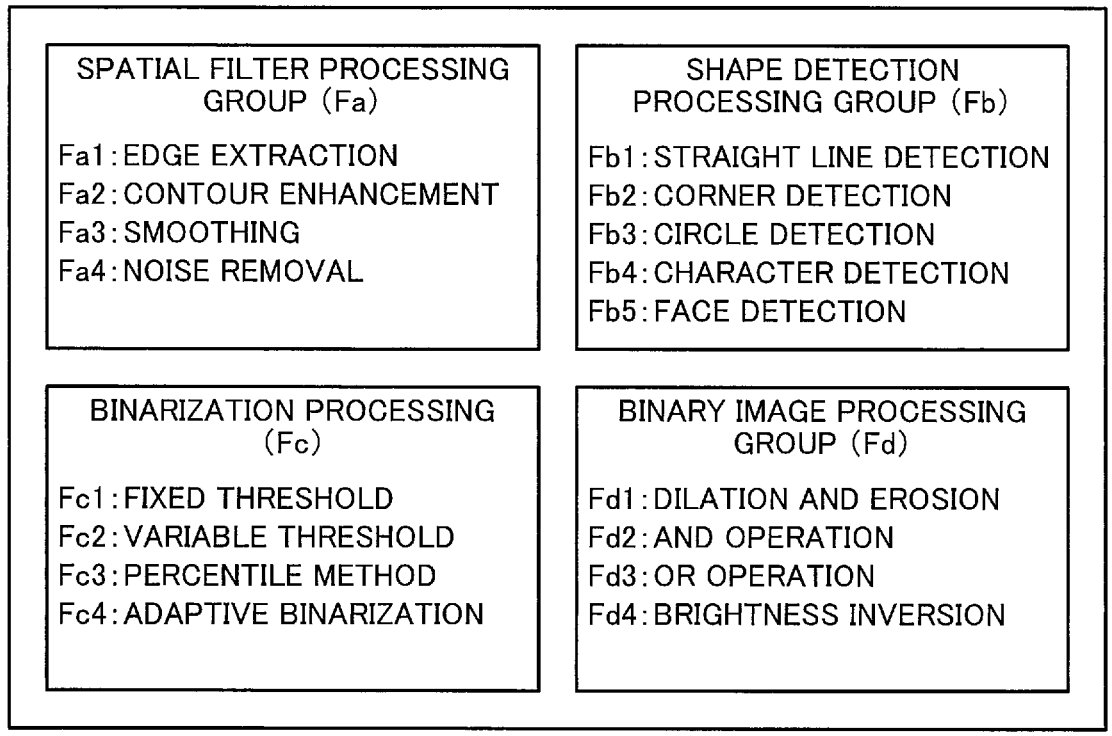
FIG. 20 illustrates an example of grouping image filters.

FIG. 20 illustrates an example of groups of image filters. In the image processing device 100a according to the fourth embodiment, the image filters registered in the filter set database 141 are classified into groups Fa to Fd. The processing contents of the image filters that belong to any one of the groups Fa to Fd are similar to each other.

Image filters for performing spatial filter processing belong to the group Fa. For example, an image filter Fa1 for performing edge extraction, an image filter Fa2 for contour enhancement, an image filter Fa3 for performing smoothing, and an image filter Fa4 for performing noise removal belong to the group Fa.

Image filters for performing shape detection processing belong to the group Fb. For example, an image filter Fb1 for performing straight line detection, an image filter Fb2 for performing corner detection, an image filter Fb3 for performing circle detection, an image filter Fb4 for performing character detection, and an image filter Fb5 for performing face detection belong to the group Fb.

Image filter for performing binarization processing belong to the group Fc. For example, an image filter Fc1 for performing binarization processing by using a fixed threshold, an image filter Fc2 for performing binarization processing by using a variable threshold, an image filter Fc3 for performing binarization processing by using a percentile method, and an image filter Fc4 for performing adaptive binarization processing belong to the group Fc.

Image filters for processing binary images belong to the group Fd. For example, an image filter Fd1 for performing dilation and erosion processing, an image filter Fd2 for performing an AND operation, an image filter Fd3 for performing an OR operation, and an image filter Fd4 for performing brightness inversion processing belong to the group Fd.

When the increase rate of the maximum fitness level is high, the image processing device 100a according to the fourth embodiment selects an image filter on the basis of "selection mode 1." In this selection mode 1, the image processing device 100a selects a mutation target image filter on the basis of the selection probabilities of the image filters that belong to the same group as that of the image filter to be replaced. When the increase rate of the maximum fitness level is high, by selecting an image filter that belongs to the same group, namely, an image filter whose processing content is similar to the image filter to be replaced, it is assumed that the chance that an image filter effective in increasing the fitness level is selected is increased.

However, in the above selection mode 1, the chance that the solution search ends up in a local solution search is also high. Thus, when the increase rate of the maximum fitness level is equal to or less than a predetermined threshold Th_H, the image processing device 100a sets selection mode 2 in which an image filter is selected more randomly than in the selection mode 1. In selection mode 2, the image processing device 100a selects an image filter on the basis of the selection probabilities of all the image filters. Since this switching from selection mode 1 to selection mode 2 expands the solution search range, it is more likely that the increase of the fitness level is accelerated.

In addition, when the increase rate of the maximum fitness level is equal to or less than a predetermined threshold Th_L that is less than the threshold Th_H, the image processing device 100b sets selection mode 3 in which an image filter is selected even more randomly. In selection mode 3, the image processing device 100a randomly selects an image filter from all the image filters. Since this switching from selection mode 2 to selection mode 3 expands the solution search range, it is more likely that the increase of the fitness level is accelerated.

In this processing, it is more likely that a higher maximum fitness level is calculated and that the fitness level reaches a high value more quickly. As a result, it is more likely that less time is needed for the processing for generating an image processing program. The program generation processing performed by the image processing device 100a according to the fourth embodiment is realized by changing the processing in step S26a in FIG. 18 to processing in FIG. 21 and changing the processing in step S41 in FIG. 18 to processing in FIG. 22.

Figure 21:
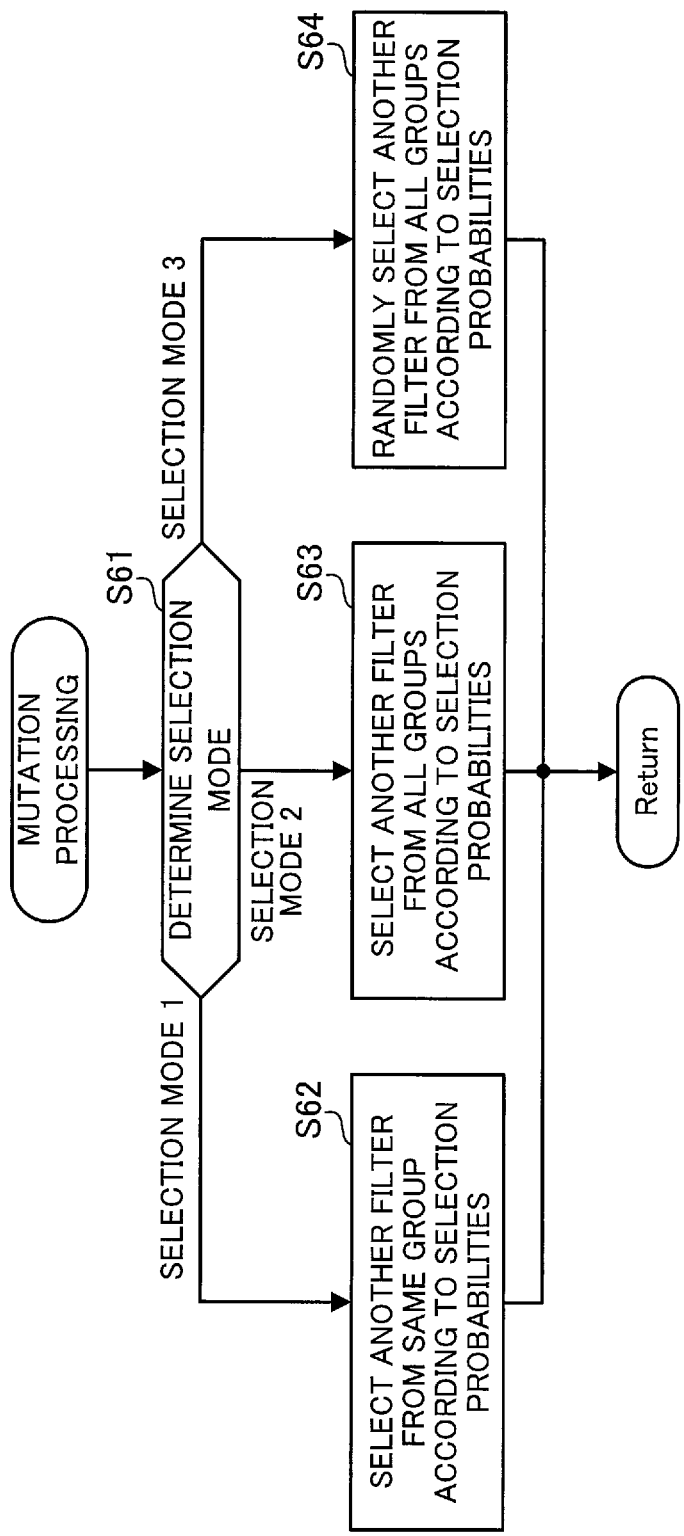
FIG. 21 is a flowchart illustrating an example of a procedure of mutation processing according to a fourth embodiment.

FIG. 21 is a flowchart illustrating an example of a procedure of mutation processing according to the fourth embodiment.

[Step S61] The learning control unit 121a refers to the mode storage unit 170a and determines the current selection mode. If the current selection mode is selection mode 1, the operation proceeds to step S62. If the current selection mode is selection mode 2, the operation proceeds to step S63. If the current selection mode is selection mode 3, the operation proceeds to step S64.

In steps S62 to S64, the learning control unit 121a performs mutation processing on a child individual generated in the processing in step S25 in FIG. 18 by replacing an image filter included in the child individual by one of the other image filters specified in step S22. In this operation, the learning control unit 121 selects a substituting image filter as follows.

[Step S62] The learning control unit 121a selects the group to which the image filter to be replaced belongs. The learning control unit 121a selects an image filter on the basis of the probabilities set in the filter set database 141 from the image filters other than the image filter to be replaced.

For example, when the image filter Fa1 is replaced by another image filter that belongs to the group Fa, the probabilities used when a substituting image filter is selected are calculated as follows. Assuming that the selection probabilities set to the image filters Fa2 to Fa4 are Sa2 to Sa4, respectively, the learning control unit 121a selects the image filters Fa2 to Fa4 with probabilities of Sa2/(Sa2+Sa3+Sa4), Sa3/(Sa2+Sa3+Sa4), and Sa4/(Sa2+Sa3+Sa4), respectively.

[Step S63] The learning control unit 121a selects a substituting image filter on the basis of the selection probabilities associated with image filters in the filter set database 141 from the image filters in all the groups.

[Step S64] The learning control unit 121a randomly selects a substituting image filter from the image filters in all the groups.

Figure 22:
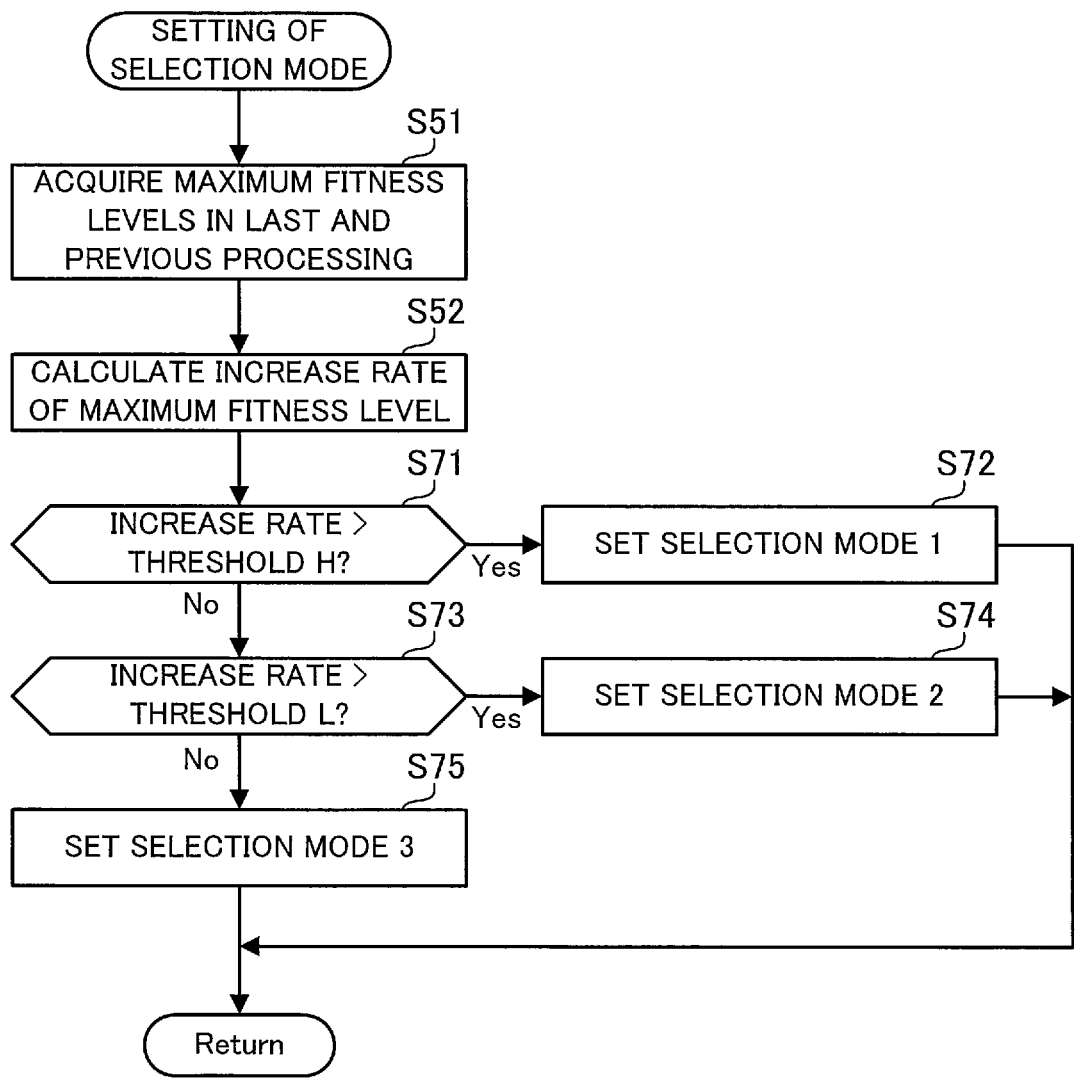
FIG. 22 is a flowchart illustrating an example of a procedure of selection mode setting processing according to the fourth embodiment.

FIG. 22 is a flowchart illustrating an example of a procedure of selection mode setting processing according to the fourth embodiment. Since the processing contents in steps S51 and S52 in FIG. 22 are the same as those in steps S51 and S52 in FIG. 19, description thereof will be omitted.

[Step S71] The mode setting unit 126a compares the calculated increase rate with the predetermined threshold H (H>0). If the increase rate is over the threshold H, the operation proceeds to step S72. If the increase rate is not over the threshold H, the operation proceeds to step S73.

[Step S72] The mode setting unit 126a updates the selection mode set in the mode storage unit 170a to selection mode 1.

[Step S73] The mode setting unit 126a compares the calculated increase rate with the predetermined threshold L (H>L>0). If the increase rate is over the threshold L, the operation proceeds to step S74. If the increase rate is equal to or less than the threshold L, the operation proceeds to step S74.

[Step S74] The mode setting unit 126a updates the selection mode set in the mode storage unit 170a to selection mode 2.

[Step S75] The mode setting unit 126a updates the selection mode set in the mode storage unit 170a to selection mode 3.

While the selection mode can be switched among selection modes 1 to 3 in the fourth embodiment, alternatively, the selection mode may be switched between selection modes 1 and 3. For example, the processing in FIG. 22 may be modified so that selection mode 1 is set when the increase rate is over the threshold H and selection mode 3 is set when the increase rate is equal to or less than the threshold H.

Figure 23:
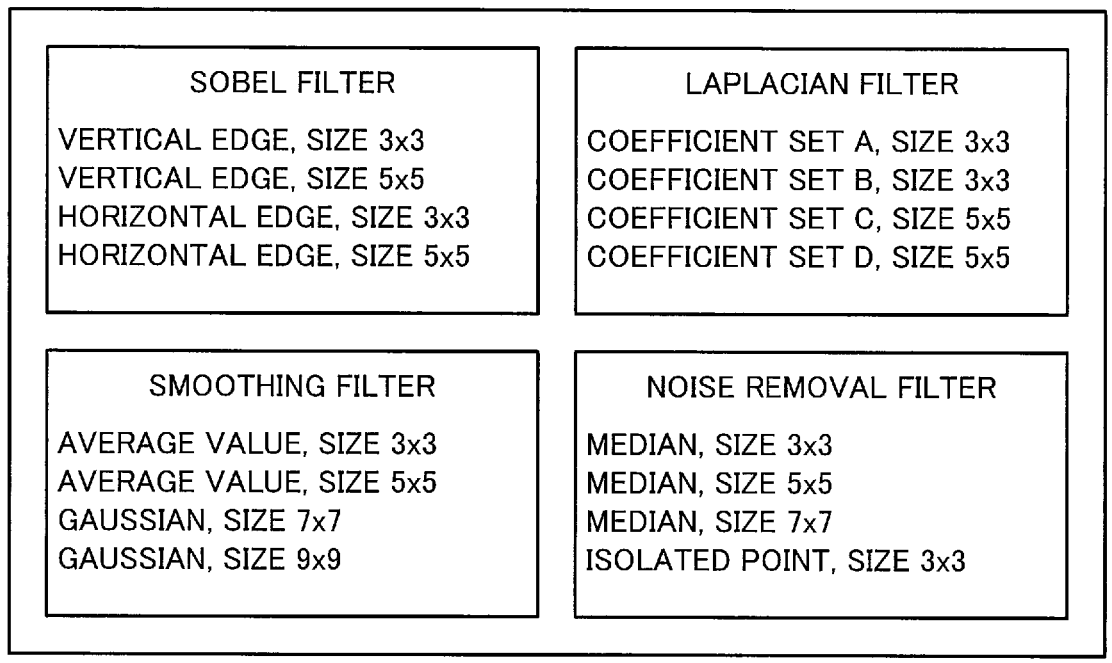
FIG. 23 illustrates another example of grouping image filters.

The image filters may be grouped as illustrated in FIG. 23.

FIG. 23 illustrates another example of grouping image filters. FIG. 23 illustrates an example in which image filters are divided into four groups, each of which includes the same kind of image filter having different parameters set.

Sobel filters having different parameters set belong to a Sobel filter group. For example, a parameter indicating detection of a vertical edge or a horizontal edge and a parameter indicating a kernel size are used.

Laplacian filters having different parameters set belong to a Laplacian filter group. For example, coefficient sets each indicating a different combination of coefficients and a parameter indicating a kernel size are used.

Smoothing filters having different parameters set belong to a smoothing filter group. For example, a parameter indicating a function for average value calculation or a function as a Gaussian filter and a parameter indicating a kernel size are used.

Noise removal filters having different parameters set belong to a noise removal filter group. For example, a parameter specifying a function as a Median filter or an isolated-point removal filter and a parameter indicating a kernel size are used.

By using the image filters as classified in FIG. 23 and performing the processing described with reference to FIGS. 21 and 22, the fitness level reaches a high value more quickly. As a result, the chance that less time is needed for processing for generating an image processing program is increased.

The processing functions of each of the devices according to the above embodiments (the program generation device 1 and the image processing devices 100 and 100a) may be realized by a computer. In this case, a program in which the processing contents of the functions of any one of the devices are written is provided. By causing a computer to execute the program, the above processing functions are realized by the computer. The program in which the processing contents are written may be recorded in a computer-readable recording medium. Examples of the computer-readable recording medium include a magnetic storage device, an optical disc, a magneto-optical recording medium, and a semiconductor memory. Examples of the magnetic storage device include an HDD, a flexible disk (FD), and a magnetic tape. Examples of the optical disc include a DVD (digital versatile disc), a DVD-RAM, a CD-ROM (compact disc read-only memory), and a CD-R (Recordable)/RW (ReWritable). Examples of the magneto-optical recording medium include an MO (magneto-optical disk).

To distribute the program, for example, portable recording media such as DVDs or CD-ROMs in which the program is recorded may be sold. The program may be stored in a storage device in a server computer and be forwarded to another computer from the server computer via a network.

For example, a computer that executes the program stores the program recorded in a portable recording medium or forwarded from the server computer in its storage device. Next, the computer reads the program from its storage device and performs processing in accordance with the program. The computer may directly read the program from the portable recording medium and execute processing in accordance with the program. Each time the program is forwarded from the server computer connected via the network, the computer may execute the processing in accordance with the program received.

According to one aspect, the time needed to generate an image processing program is shortened.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A program generation apparatus comprising:
   a memory; and
   a processor configured to perform a procedure including:
      generating an image processing program by determining, based on genetic programming, a combination of partial programs to be included in the image processing program from a plurality of partial programs, the generating including evolution processing for evolving an individual formed by a combination of partial programs selected from the plurality of partial programs;
      recording, in the memory, information indicating a type of partial program that has been changed in number between pre- and post-evolution individuals and indicating difference between fitness levels calculated based on the pre- and post-evolution individuals, respectively, each time the evolution processing is performed; and
      determining, for each of the plurality of partial programs, a contribution level indicating how much an individual partial program contributes to increasing a fitness level, based on information accumulated in the memory within a predetermined time period and setting a selection probability for each of the plurality of partial programs in such a manner that a first partial program having a higher contribution level than a second partial program is given a higher setting value as a selection probability of the first partial program than the second partial program, wherein the evolution processing performed after the setting of the selection probability for each of the plurality of partial programs includes selecting a partial program to be included in a post-evolution individual in mutation processing from the plurality of partial programs according to selection probabilities set for respective ones of the plurality of partial programs.

2. The program generation apparatus according to claim 1, wherein the recording includes recording, each time the evolution processing is performed, an increased amount of fitness level, the increased amount being based on a value obtained by subtracting the fitness level based on the pre-evolution individual from the fitness level based on the post-evolution individual, in association with an individual type of a partial program that has been increased in number as a result of the evolution processing in the memory, and wherein the setting includes setting the selection probability per partial program, based on the increased amount of the fitness level per partial program accumulated in the memory within the predetermined time period.

3. The program generation apparatus according to claim 2, wherein, based on the increased amount of the fitness level per partial program accumulated in the memory within the predetermined time period, the setting includes determining the contribution level per partial program and removing a partial program whose contribution level determined is equal to or less than a predetermined value from selection targets in the evolution processing performed subsequently.

4. The program generation apparatus according to claim 2, wherein the increased amount of the fitness level is calculated by defining the value obtained by subtracting the fitness level based on the pre-evolution individual from the fitness level based on the post-evolution individual with the number of corresponding partial programs added in the post-evolution individual.

5. The program generation apparatus according to claim 1, wherein the procedure further includes:
monitoring transition of a maximum fitness level calculated when the evolution processing is performed; and
determining, based on an increase rate of the maximum fitness level, whether to select a partial program to be included in a post-evolution individual in mutation processing performed when the evolution processing performed subsequently is performed according to the selection probabilities or randomly.

6. The program generation apparatus according to claim 1, wherein the plurality of partial programs are classified into a plurality of groups, based on similarity in processing content, and
wherein the procedure further includes:
monitoring transition of a maximum fitness level calculated when the evolution processing is performed; and
determining, based on an increase rate of the maximum fitness level, whether to select a partial program to be included in a post-evolution individual in mutation processing performed when the evolution processing performed subsequently is performed according to the selection probabilities from other partial programs that belong to a same group to which a partial program to be replaced in the pre-evolution individual belongs or from all the plurality of partial programs.

7. The program generation apparatus according to claim 1, wherein the plurality of partial programs are classified into groups in such a manner that partial programs that are used for a same kind of processing and that have different parameters set belong to a same group, and
wherein the procedure further includes:
monitoring transition of a maximum fitness level calculated when the evolution processing is performed; and
determining, based on an increase rate of the maximum fitness level, whether to select a partial program to be included in the post-evolution individual in mutation processing performed when the evolution processing performed subsequently is performed according to the selection probabilities from other partial programs that belong to a same group to which a partial program to be replaced in the pre-evolution individual belongs or from all the plurality of partial programs.

8. A program generation method comprising:
generating, by a computer, an image processing program by determining, based on genetic programming, a combination of partial programs to be included in the image processing program from a plurality of partial programs, the generating including evolution processing for evolving an individual formed by a combination of partial programs selected from the plurality of partial programs;
recording, by the computer, information indicating a type of partial program that has been changed in number between pre- and post-evolution individuals and indicating difference between fitness levels calculated based on the pre- and post-evolution individuals, respectively, in a memory, each time the evolution processing is performed; and
determining, by the computer, for each of the plurality of partial programs, a contribution level indicating how much an individual partial program contributes to increasing a fitness level, based on information accumulated in the memory within a predetermined time period and setting a selection probability for each of the plurality of partial programs in such a manner that a first partial program having a higher contribution level than a second partial program is given a higher setting value as a selection probability of the first partial program than the second partial program,
wherein the evolution processing performed after the setting of the selection probability for each of the plurality of partial programs includes selecting a partial program to be included in a post-evolution individual in mutation processing from the plurality of partial programs according to selection probabilities set for respective ones of the plurality of partial programs.

9. The program generation method according to claim 8,
wherein, each time the evolution processing is performed, the recording includes recording an increased amount of the fitness level, the increased amount being based on a value obtained by subtracting the fitness level based on the pre-evolution individual from the fitness level based on the post-evolution individual, in association with an individual type of partial program that has been increased in number as a result of the evolution processing in the memory, and wherein, the setting include setting the selection probability per partial program, based on the increased amount of the fitness level per partial program accumulated in the memory within the predetermined time period.

10. The program generation method according to claim 9, wherein, the setting includes determining the contribution level per partial program, based on the increased amount of the fitness level per partial program accumulated in the memory within the predetermined time period, and removing a partial program whose contribution level determined is equal to or less than a predetermined value from selection targets in the evolution processing performed subsequently.

11. The program generation method according to claim 9, wherein the increased amount of the fitness level is calculated by defining the value obtained by subtracting the fitness level based on the pre-evolution individual from the fitness level based on the post-evolution individual with the number of corresponding partial programs added in the post-evolution individual.

12. The program generation method according to claim 8, further comprising:
monitoring transition of a maximum fitness level calculated when the evolution processing is performed and determining, based on an increase rate of the maximum fitness level, whether to select a partial program to be included in a post-evolution individual in mutation processing performed when the evolution processing performed subsequently is performed according to the selection probabilities or randomly.

13. The program generation method according to claim 8, wherein the plurality of partial programs are classified into a plurality of groups, based on similarity in processing content, and wherein the program generation method further includes:
monitoring transition of a maximum fitness level calculated when the evolution processing is performed; and
determining, based on an increase rate of the maximum fitness level, whether to select a partial program to be included in a post-evolution individual in mutation processing performed when the evolution processing performed subsequently is performed according to the selection probabilities from other partial programs that belong to a same group to which a partial program to be replaced in the pre-evolution individual belongs or from all the plurality of partial programs.

14. The program generation method according to claim 8, wherein the plurality of partial programs are classified into groups in such a manner that partial programs that are used for a same kind of processing and that have different parameters set belong to a same group, and wherein the program generation method further includes:
monitoring transition of a maximum fitness level calculated when the evolution processing is performed; and
determining, based on an increase rate of the maximum fitness level, whether to select a partial program to be included in a post-evolution individual in mutation processing performed when the evolution processing performed subsequently is performed according to the selection probabilities from other partial programs that belong to a same group to which a partial program to be replaced in the pre-evolution individual belongs or from all the plurality of partial programs.

15. A non-transitory computer-readable storage medium storing a computer program that causes a computer to perform a procedure comprising:
generating an image processing program by determining, based on genetic programming, a combination of partial programs to be included in the image processing program from a plurality of partial programs, the generating including evolution processing for evolving an individual formed by a combination of partial programs selected from the plurality of partial programs;
recording information indicating a type of partial program that has been changed in number between pre- and post-evolution individuals and indicating difference between fitness levels calculated based on the pre- and post-evolution individuals, respectively, in a memory, each time the evolution processing is performed; and
determining, for each of the plurality of partial programs, a contribution level indicating how much an individual partial program contributes to increasing a fitness level, based on information accumulated in the memory within a predetermined time period and setting a selection probability for each of the plurality of partial programs in such a manner that a first partial program having a higher contribution level than a second partial program is given a higher setting value as a selection probability of the first partial program than the second partial program, wherein the evolution processing performed after the setting of the selection probability for each of the plurality of partial programs includes selecting a partial program to be included in a post-evolution individual in mutation processing from the plurality of partial programs according to selection probabilities set for respective ones of the plurality of partial programs.

\* \* \* \* \*